(12) United States Patent
Lubanski

(10) Patent No.: US 8,288,652 B2
(45) Date of Patent: Oct. 16, 2012

(54) TAPERED TRANSITION RAMP FOR CABLE PROTECTOR WITH OFFSET CENTER SECTIONS

(75) Inventor: Thomas M. Lubanski, Claremont, CA (US)

(73) Assignee: Checkers Industrial Products, LLC, Broomfield, CO (US)

( * ) Notice: Subject to any disclaimer, the term of this patent is extended or adjusted under 35 U.S.C. 154(b) by 322 days.

(21) Appl. No.: 12/423,967

(22) Filed: Apr. 15, 2009

(65) Prior Publication Data

US 2009/0194328 A1 Aug. 6, 2009

Related U.S. Application Data

(63) Continuation-in-part of application No. 11/379,442, filed on Apr. 20, 2006, now Pat. No. 7,674,980, and a continuation-in-part of application No. 11/691,311, filed on Mar. 26, 2007, now Pat. No. 7,595,450.

(51) Int. Cl.
*H01R 4/00* (2006.01)
*H01R 4/50* (2006.01)
*H02G 15/08* (2006.01)

(52) U.S. Cl. ....... 174/72 R; 174/72 C; 174/97; 174/135; 104/275; 14/69.5; 404/16; 404/35; 404/40

(58) Field of Classification Search ................ 174/72 C, 174/72 R, 97, 135; 104/275; D13/155; 14/69.5; 404/16, 35, 40; *H01R 4/00, 4/50; H02G 15/08*
See application file for complete search history.

(56) References Cited

U.S. PATENT DOCUMENTS

| 72,028 A | 10/1867 | Haase |
|---|---|---|
| 585,540 A | 6/1897 | Spangler |
| 883,186 A | 3/1908 | Fine |
| 1,914,830 A | 6/1933 | Kostohris |
| 2,027,619 A | 1/1936 | Rutherford |
| 2,079,274 A | 5/1937 | Baker |
| 2,166,031 A | 7/1939 | Wendell |
| 2,299,356 A | 2/1940 | Strohm et al. |
| 2,594,425 A | 4/1952 | Greenberg |
| 2,927,396 A | 3/1960 | Hall, Jr. |
| 3,118,017 A | 1/1964 | Wimbish |
| 3,725,580 A | 1/1973 | Thompson |
| 3,878,317 A | 4/1975 | Plaskon |
| 3,888,186 A | 6/1975 | Jentzsch et al. |
| 3,965,967 A | 6/1976 | Jentzsch et al. |
| 4,067,258 A | 1/1978 | Valeri |
| 4,101,100 A | 7/1978 | Smith et al. |
| 4,192,062 A | 3/1980 | Balde et al. |
| 4,373,306 A | 2/1983 | Rech |
| 4,468,910 A * | 9/1984 | Morrison ............ 52/591.2 |
| 4,677,799 A | 7/1987 | Zarembo |

(Continued)

FOREIGN PATENT DOCUMENTS

DE 20012041 U1 2/2001

*Primary Examiner* — John K Kim
(74) *Attorney, Agent, or Firm* — Holland & Hart LLP

(57) ABSTRACT

An exemplary ramp structure capable of being positioned over at least a portion of a cable protection system comprises first and second center portions, a first side ramp portion adjacent a side of each center portion, and a first tapered portion adjacent an end of the first side ramp portion. The first tapered portion may be tapered in at least two different directions that are substantially orthogonal to each other.

32 Claims, 19 Drawing Sheets

U.S. PATENT DOCUMENTS

| | | | |
|---|---|---|---|
| 4,697,294 A * | 10/1987 | Schafer | 14/69.5 |
| 4,817,224 A | 4/1989 | Visnaw et al. | |
| 4,819,910 A | 4/1989 | Johnston | |
| 5,095,822 A | 3/1992 | Martin | |
| 5,267,367 A | 12/1993 | Wegmann, Jr. | |
| 5,446,937 A | 9/1995 | Haskins | |
| 5,566,622 A | 10/1996 | Ziaylek, Jr. et al. | |
| 5,777,266 A * | 7/1998 | Herman et al. | 174/68.1 |
| D412,490 S | 8/1999 | Henry | |
| 5,933,898 A | 8/1999 | Estes et al. | |
| D415,112 S | 10/1999 | Henry | |
| D415,471 S | 10/1999 | Henry | |
| D418,818 S | 1/2000 | Henry | |
| 6,067,681 A | 5/2000 | Zeinstra et al. | |
| D429,695 S | 8/2000 | Henry | |
| D436,578 S | 1/2001 | Henry | |
| D437,832 S | 2/2001 | Henry | |
| 6,202,565 B1 | 3/2001 | Henry | |
| 6,481,036 B1 | 11/2002 | Duvall | |
| 6,498,297 B2 | 12/2002 | Samhammer | |
| 6,654,977 B1 | 12/2003 | Chin | |
| 6,747,212 B1 | 6/2004 | Henry | |
| 6,878,881 B1 | 4/2005 | Henry | |
| 6,993,801 B2 | 2/2006 | Marko et al. | |
| 7,145,078 B2 * | 12/2006 | Henry | 174/101 |
| 7,203,412 B2 | 4/2007 | Moore | |
| 7,309,836 B2 | 12/2007 | Lubanski | |
| 7,385,139 B2 | 6/2008 | Lubanski | |
| D583,771 S | 12/2008 | Lubanski | |
| 7,591,605 B2 * | 9/2009 | Jonasz et al. | 404/15 |
| 7,592,547 B2 | 9/2009 | Lubanski | |
| 2002/0038716 A1 | 4/2002 | Pineda | |
| 2009/0194328 A1 * | 8/2009 | Lubanski | 174/72 R |

* cited by examiner

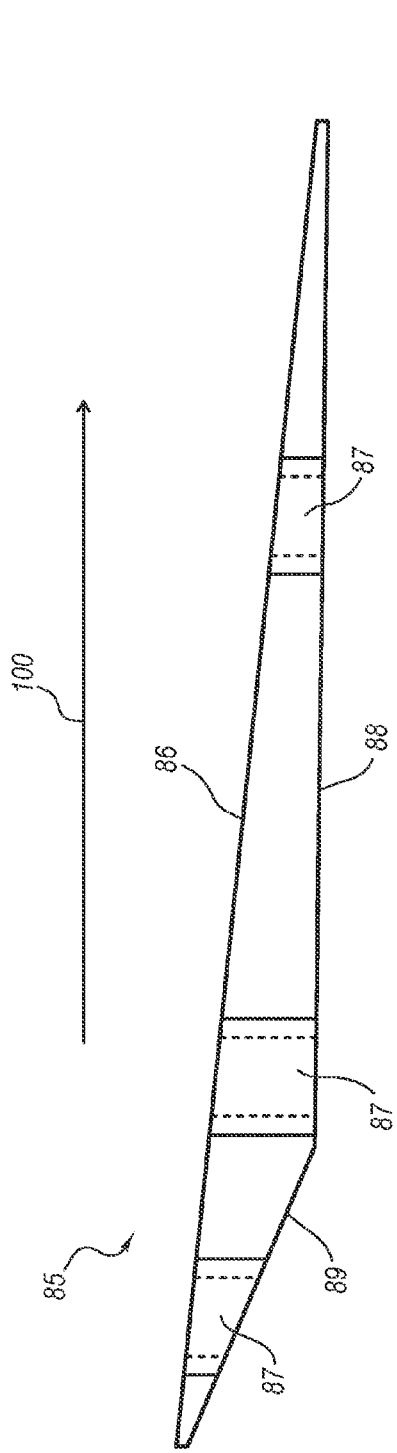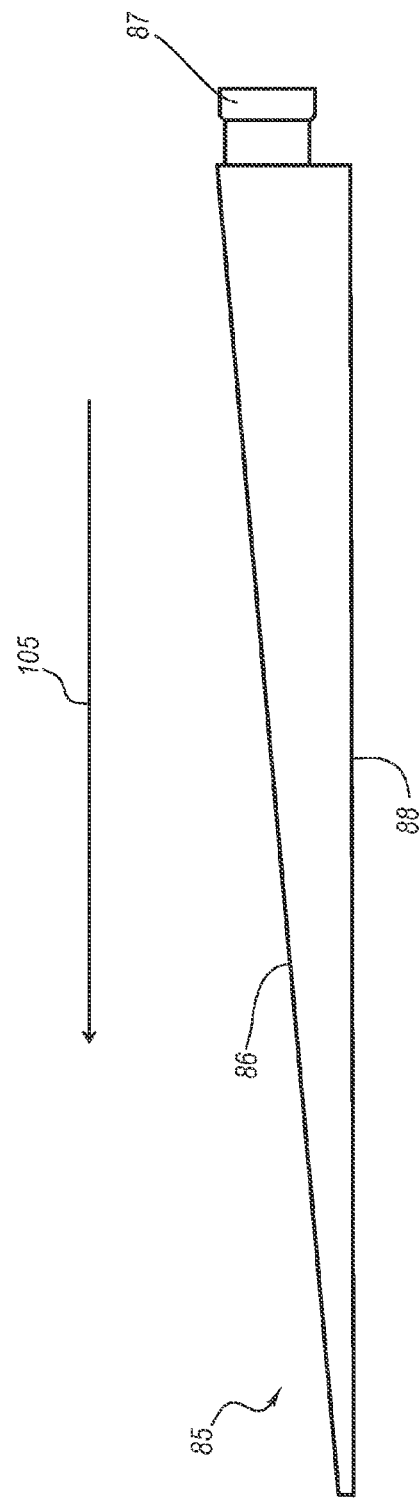
Figure 4A
Figure 4B

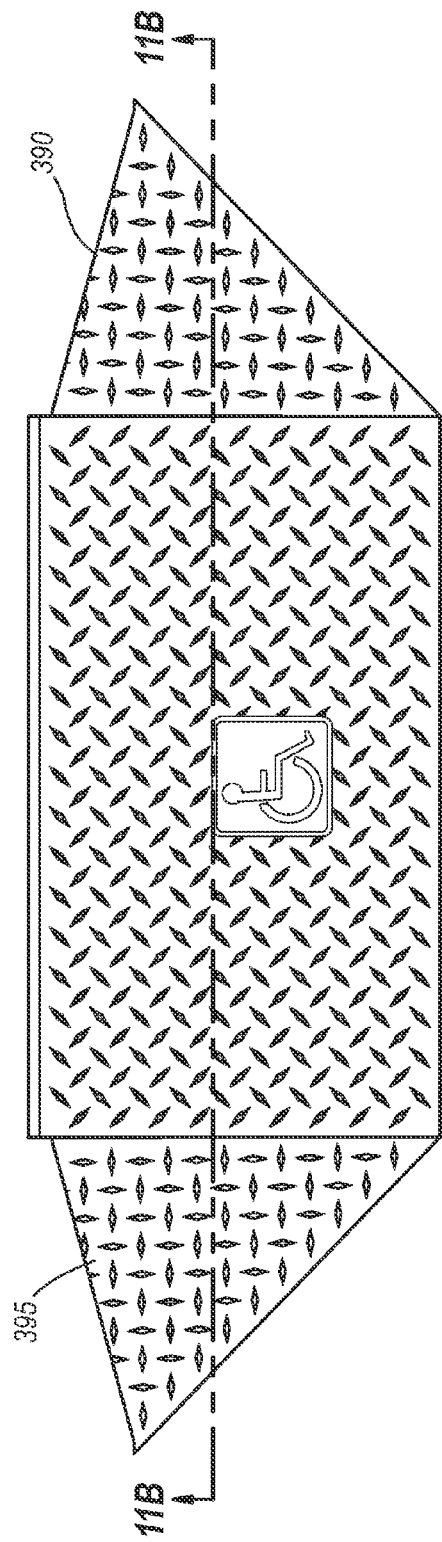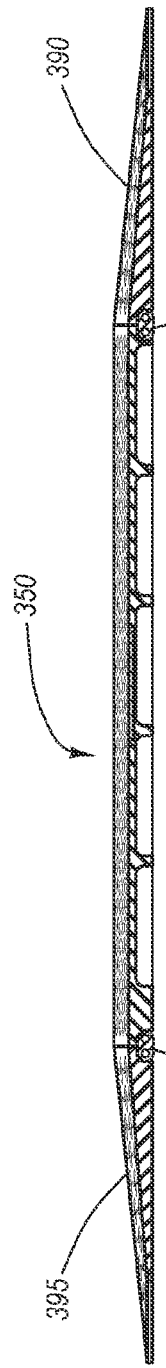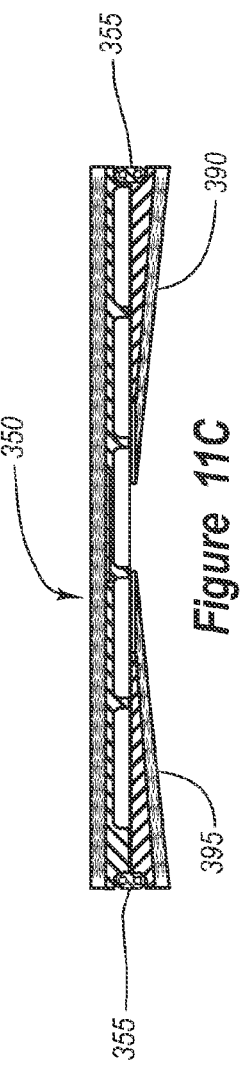
Figure 11A
Figure 11B
Figure 11C

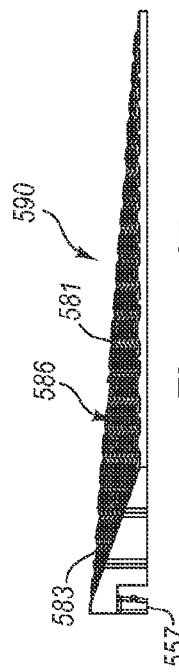
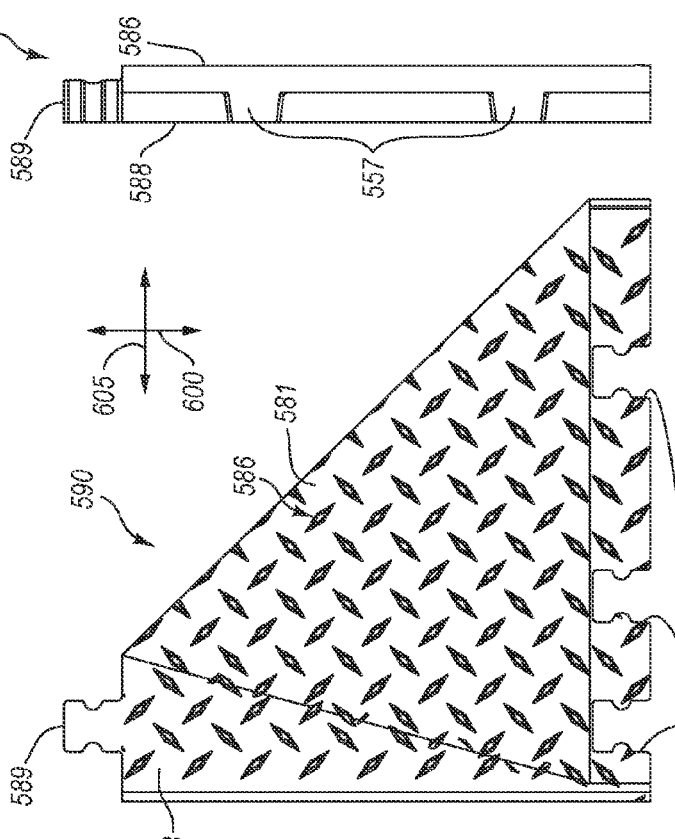
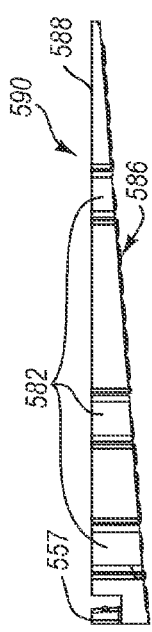
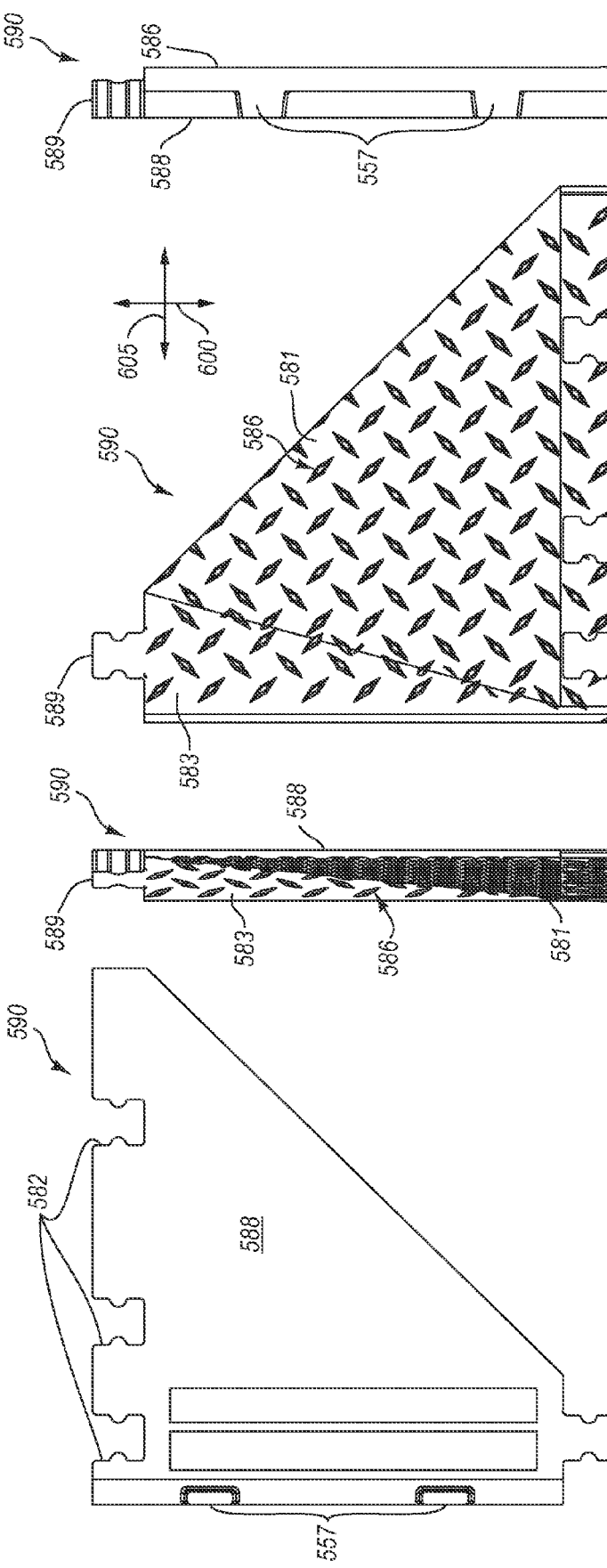

TAPERED TRANSITION RAMP FOR CABLE PROTECTOR WITH OFFSET CENTER SECTIONS

CROSS REFERENCE TO RELATED APPLICATION

This application is a continuation-in-part of U.S. application Ser. No. 11/379,442, filed 20 Apr. 2006, and a continuation-in-part of U.S. application Ser. No. 11/691,311, filed on 26 Mar. 2007, the disclosures of which are incorporated, in their entirety, by this reference.

FIELD OF THE INVENTION

The instant disclosure relates generally to cable protectors and cable protection systems.

BACKGROUND

Over the years, various devices and apparatuses have been developed in an effort to protect hoses, cables, wiring, and the like from physical damage. In particular, numerous cable protector designs have been developed to protect cabling extending across walkways, roadways, and construction sites from physical damage caused by pedestrians, vehicular traffic, and other such external elements. Cable protectors have also proven useful in helping to minimize the risk of pedestrians tripping over such cabling. For the purposes of this disclosure, the terms "cable" and "cabling" shall be broadly construed to include data cables, hoses, electrical wiring, telephone cables, conduits, optical fibers, pneumatic tubing, plumbing, and any other length of material.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. In some cases, these side ramps are configured to have a relatively gradual slope so that a wheelchair, walker, or the like can pass over the cable protector with minimal effort. In accordance with guidelines established by the Americans with Disabilities Act ("ADA"), many conventional cable protectors and ramps are also equipped with side rails to prevent people or wheelchairs from slipping off the sides of the cable protector or side ramp. These side rails are typically positioned substantially parallel to the ends of the cable protector and/or side ramp.

Although conventional side rails are generally effective in preventing wheelchairs, walkers, strollers, and the like from sliding off the ends of the ramp, these rails may limit the range of use of the cable protector. For example, the conventional parallel configuration of side rails, which typically extend at least two inches above the cable protector's surface, mandates that a user of a wheelchair, walker, stroller, or the like approach the cable protector in a direction substantially parallel to the side rails. In other words, conventional side rails may prevent users of wheelchairs, walkers, and strollers from approaching the cable protector and/or side ramp from directions or angles that intersect with the parallel side rails. Similarly, the parallel configuration of these side rails requires that such users travel in a substantially straight line over the cable protector and side ramps in order to avoid a collision with the side rails.

Accordingly, a need exists for a cable protection system in which users of wheelchairs, walkers, strollers, and the like may approach and cross over the system from a wider range of directions and angles.

SUMMARY

According to at least one aspect of the present disclosure, a ramp structure capable of being positioned over at least a portion of a cable protection system includes first and second center portions, a first side ramp portion, and a first tapered portion. The first and second center portions each have a first side, a second side, a first end and a second end. The first and second center portions are arranged in series. The first side ramp portion is positioned adjacent to the first side of the first center portion and the first side of the second center portion, and includes a first end and a second end. The first tapered portion is positioned adjacent to the first end of the first side ramp portion and includes a top surface having a first portion that tapers in a first direction away from the first and second center portions, and a second portion that tapers in a second direction away from the first side ramp.

The first tapered portion may be substantially triangular in shape. Some embodiments include the first and second portions of the first tapered portion each have a triangular shape. The first direction of taper for the first tapered portion may be substantially orthogonal to the second direction of taper. The top surface of the first tapered portion may be substantially planar. The first end of the second center portion may be coupled to the second end of the first center portion at a center portion joint, wherein the first side ramp portion overlapping the center portion joint.

The ramp structure may further include a second tapered portion positioned adjacent to the second end of the first side ramp portion, wherein the second tapered portion has a top surface that tapers in a least one of a first direction away from the first and second center portions and a second direction away from the first side ramp portion. The first and second tapered portions may be coupled to the first side ramp portion, wherein the first and second tapered portions and the first side ramp portion defines a first ramp assembly. The first ramp assembly may have a first ramp assembly length that is substantially equal to a combined length of the first and second center ramp portions. The ramp assembly may include a plurality of vertically oriented apertures, and the first and second center portions may include a plurality of projections that extend from the first and second center portions in a generally vertical direction, the projections being releaseably inserted in the apertures.

In some embodiments, the ramp structure further includes a second side ramp portion and a third tapered portion. The second side ramp portion may be positioned adjacent to the second side of the first center portion and the second side of the second center portion, wherein the second side ramp portion comprising a first end and a second end. The third tapered portion may be positioned adjacent to the first end of the second side ramp portion and have a top surface that tapers in a least one of a first direction away from the first and second center portions and a second direction away from the second side ramp portion. The ramp structure may further include a fourth tapered portion positioned adjacent to the second end of the second side ramp portion. The fourth tapered portion has a top surface that tapers in a least one of a first direction away from the first and second center portions and a second direction away from the second side ramp portion. The third and fourth tapered portions may be coupled to the second side ramp portion. The third and fourth tapered portions and the second side ramp portion may define a second ramp assembly, wherein the second ramp assembly has a second ramp assembly length that is substantially equal to a combined length of the first and second center ramp portions. The second ramp assembly may include a plurality of projections that extend from the ramp assembly in a generally vertical direction. The first and second center portions may include a plurality of vertically oriented apertures, wherein the projections of the second ramp assembly releaseably insert in the apertures of the first and second center portions.

Another aspect of the present disclosure relates to a cable protection system that includes first and second cable protectors, a first side ramp, and first and second tapered structures. The first and second cable protectors each include a first side, a second side, opposing ends, and a top surface. The first cable protector defines at least a first channel extending between the opposing ends of the first cable protector. The second cable protector is arranged in series with the first cable protector, and defines at least a second channel extending between the opposing ends of the second cable protector that is arranged coaxial with the first channel. The first side ramp includes a top surface, a first side, a second side, a first end, and a second end, and is positioned adjacent to the first side of the first cable protector and the first side of the second cable protector. The first tapered structure may be releaseably attached to the first end of the first side ramp. The first tapered structure includes a top surface and a bottom surface, wherein the top surface is tapered relative to at least one of the top surface of the first side ramp and the top surface of at least one of the first and second cable protectors. The second tapered structure may be releaseably attached to the second end of the first side ramp. The second tapered structure includes a top surface and a bottom surface, wherein the top surface of the first tapered structure is tapered relative to at least one of the top surface of the first side ramp and the top surface of at least one of the first and second cable protectors.

The top surface of the first tapered structure may taper in a first direction and a second direction, wherein the first direction is substantially orthogonal to the second direction. The first end of the second cable protector may be positioned adjacent to the second end of the first cable protector at a cable protector joint, and the first side ramp overlaps the cable protector joint. The cable protector joint may be arranged at a midpoint along a length of the first side ramp. The first and second cable protectors may be releaseably connected to the first side ramp, the first tapered structure, and the second tapered structure. The cable protection system may further include a second side ramp, and third and fourth tapered structures. The second side ramp may be positioned adjacent to the second side of the first cable protector and the second side of the second cable protector. The second side ramp may include a top surface, a first side, a second side, a first end, and a second end. The third tapered structure may be attached to the first end of the second side ramp, and the fourth tapered structure may be attached to the second end of the second side ramp. A combined length of the first side ramp and the first and second tapered structures may be substantially the same as a combined length of the first and second cable protectors.

A further aspect of the present disclosure relates to a cable protection system that includes a first cable protector, a first side ramp, and a first tapered structure. The first cable protector includes a first side and a second side, and defines at least a first channel structured to receive at least one cable. The first side ramp is positioned adjacent to the first side of the first cable protector and extends beyond the first end of the first cable protector. The first side ramp may be releaseably connected to the first cable protectors. The first tapered structure may be releaseably connected to a first end of the first side ramp and include a top surface that is tapered relative to a top surface of the first side ramp and a top surface of the first cable protector.

The cable protection system may further include a second cable protector comprising a first side and a second side, and define a second channel arranged in alignment with the first channel. The first side ramp may be positioned adjacent to the first side of the second cable protector and releaseably connected to the second cable protector. The cable protection system may also include a second tapered structure releaseably connected to a second end of the first side ramp. The second tapered structure may have a top surface that is tapered relative to the top surface of the first side ramp and the top surface of the second cable protector. The first cable protector may be releaseably connected to the first tapered structure, and the second cable protector may be releaseably connected to the second tapered structure.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4A is an end view of the exemplary tapered transition structure illustrated in FIG. 3, taken along line 4A-4A;

FIG. 4B is a side view of the exemplary tapered transition structure illustrated in FIG. 3, taken along line 4B-4B;

FIG. 11A is a top view of the exemplary side ramp assembly illustrated in FIG. 10;

FIG. 11B is a cross-sectional side view of the exemplary side ramp assembly illustrated in FIG. 11A in a first position, taken along line 11B-11B;

FIG. 11C is a cross-sectional side view of an exemplary side ramp assembly in a second position;

FIG. 20 is a top view of the tapered transition structure illustrated in FIG. 16.

FIG. 21 is a bottom view of the tapered transition structure illustrated in FIG. 16.

FIG. 22 is a side view of the tapered transition structure illustrated in FIG. 16.

FIG. 23 is an opposite side view of the tapered transition structure illustrated in FIG. 16.

FIG. 24 is an end view of the tapered transition structure illustrated in FIG. 16.

FIG. 25 is an opposite end view of the tapered transition structure illustrated in FIG. 16.

Figure 1:
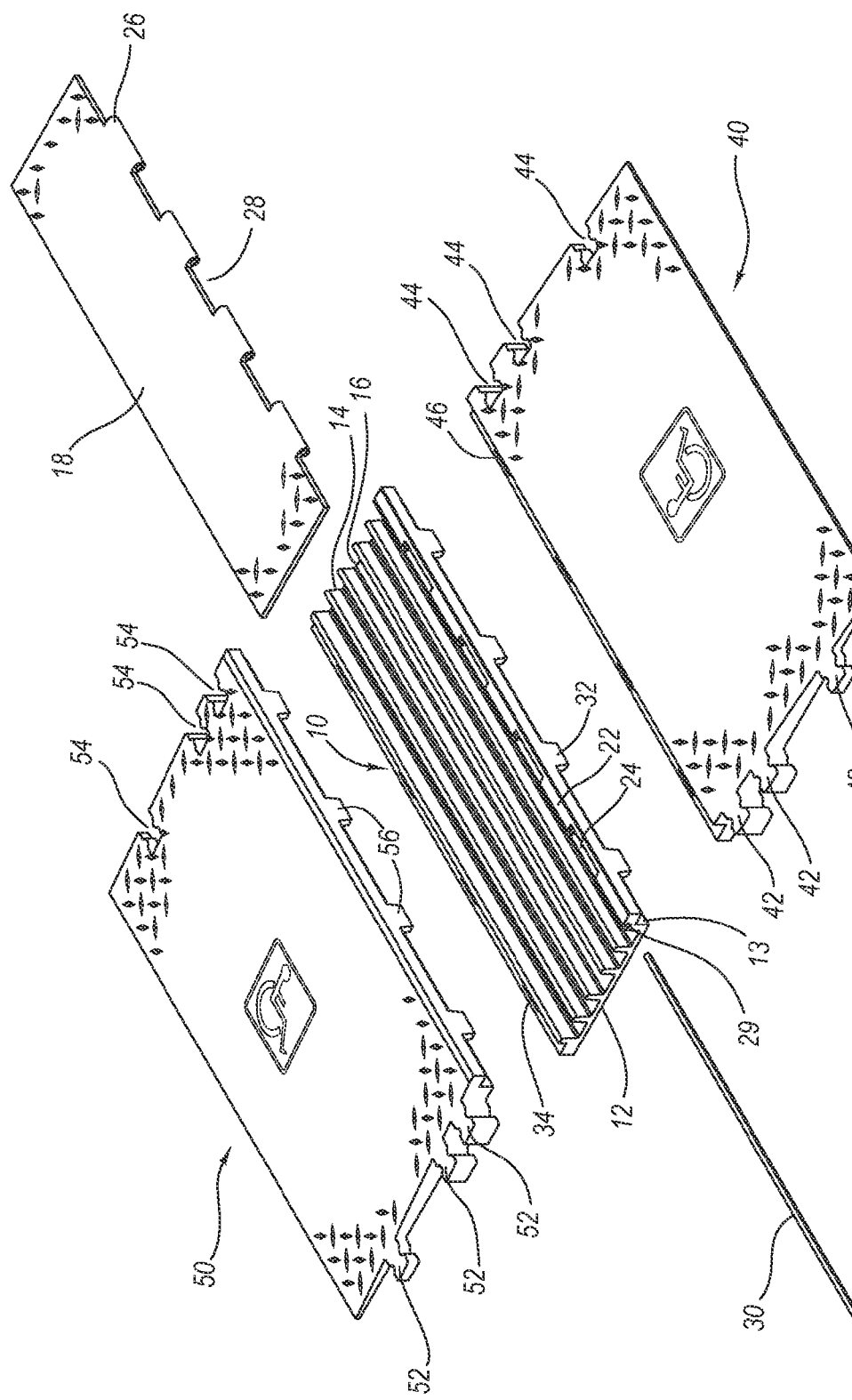
FIG. 1 is an exploded perspective view of a cable protection system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

Figure 2:
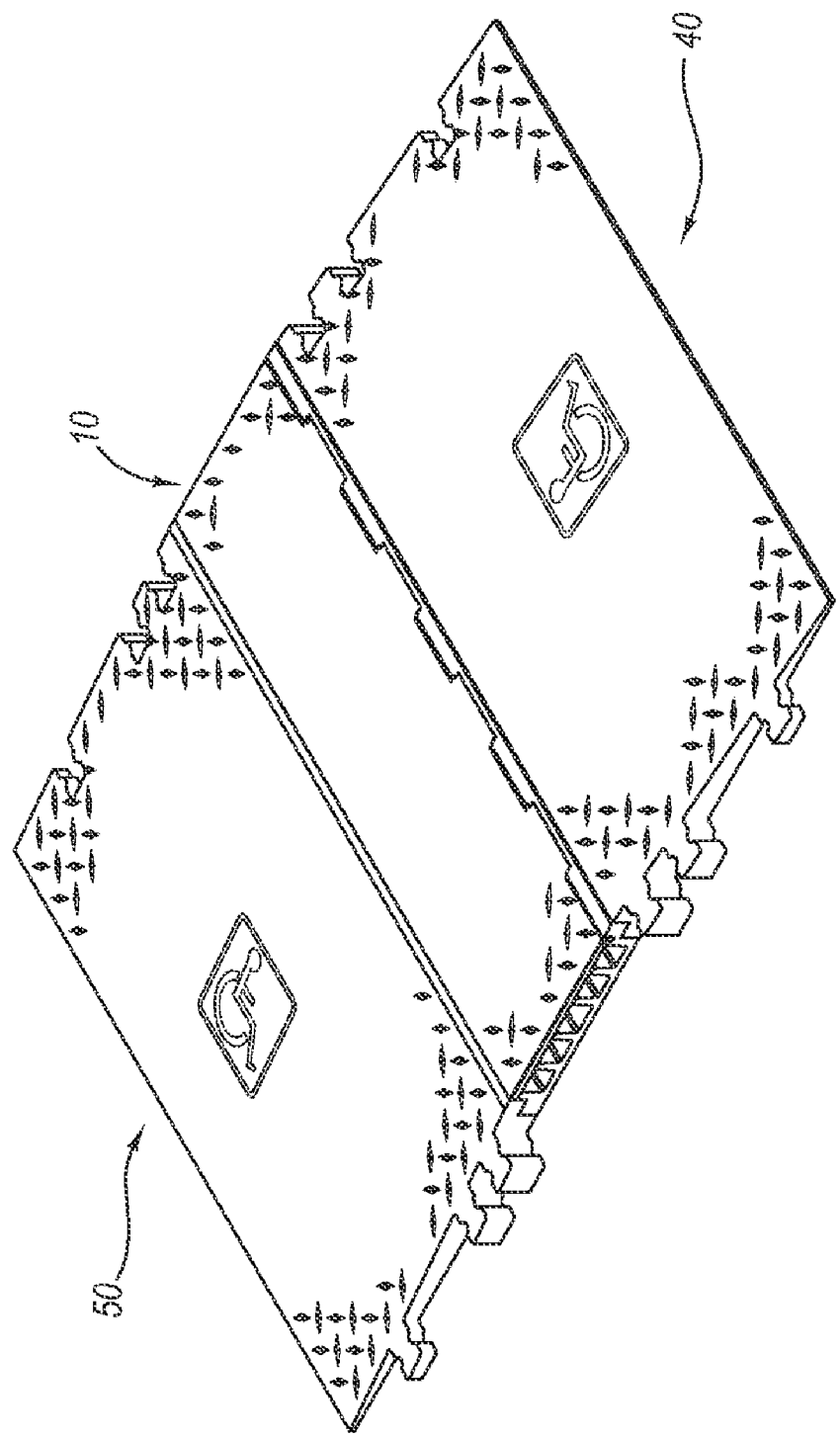
FIG. 2 is an assembled perspective view of the exemplary cable protection system illustrated in FIG. 1.

FIG. 1 is an exploded perspective view of a cable protection system according to at least one embodiment. FIG. 2 is an assembled perspective view of the exemplary cable protection system illustrated in FIG. 1. In at least one embodiment, the exemplary cable protection system illustrated in these figures comprises a cable protector 10, a first side ramp 40, and a second side ramp 50.

As illustrated in FIGS. 1 and 2, in certain embodiments cable protector 10 comprises a base member 12 having a pair of opposing side walls 13. Base member 12 may be substantially rectangular, as illustrated in FIGS. 1-2, or formed in any number of other shapes or sizes, such as a square or other multi-sided shape. In certain embodiments, opposing side walls 13 form a single channel extending within base member 12 for housing one or more cables. Alternatively, as illustrated in FIG. 1, one or more vertically extending rib members 14 may longitudinally divide the length of base member 12 into a plurality of longitudinal channels 16 for housing one or more cables. As illustrated in FIG. 1, rib member 14 may be formed to have a height that is generally coextensive with the height of the side walls 13 of base member 12.

Advantageously, when a plurality of cables are housed within base member 12, rib members 14 may act as barriers between the longitudinally extending cables to minimize tangling, electrical interference, and the like. As detailed above, numerous forms of cables and wires may be housed within base member 12; including, for example, data cables, hoses, electrical wiring, telephone cables, conduits, optical fibers, pneumatic tubing, plumbing, and any other length of material.

In the exemplary embodiments illustrated in FIGS. 1-2, a cover 18 may be pivotally attached to base member 12 by a hinge structure. In this exemplary embodiment, the hinge structure may comprise a plurality of alternately spaced hinge members 22 formed on an upper surface of one of the side walls 13 of base member 12, and a plurality of alternately spaced hinge members 26 formed on one side of cover 18. In certain embodiments, hinge members 22 and 26 are formed in a hollow, tubular shape so as to be capable of housing a cylindrical or rod-like member, such as a hinge rod or pin. Although illustrated in FIGS. 1-2 as a substantially continuous hinge structure, this hinge structure may also be formed of any number of hinge structures known to those of skill in the art; including, for example, a flush hinge, a barrel hinge, a butt hinge, or a concealed hinge.

As illustrated in FIG. 1, hinge members 22 may be spaced along side wall 13 of base member 12 so as to mate with an equal number of recesses 28 of similar dimension defined along the side of cover 18. Similarly, hinge members 26 may be spaced along the side of cover 18 so as to mate with an equal number of recesses 24 of similar dimension defined along the upper surface of side wall 13 of base member 12. The lengths, widths and depths of recesses 24, 28 may be defined to be slightly larger than those of hinge members 22, 26, respectively, in order to allow hinge members 22, 26 to be easily inserted into recesses 24, 28. When properly mated and aligned, hinge members 22, 26 define a substantially continuous passageway 29 extending throughout the length of the aligned hinge members. In certain embodiments, passageway 29 is defined so as to be substantially cylindrical.

In at least one exemplary embodiment, a rod member 30 is inserted throughout the passageway 29 defined by the aligned hinge members 22, 26 to pivotally hinge cover 18 to base member 12. Although rod member 30 may be formed to be substantially cylindrical, rod member 30 may also be formed of any structure or shape capable of hinging opposing structures. The various elements of hinge structure 20 may thus enable cover 18 to freely pivot about rod member 30 as cable protector 10 is opened and closed. When in a closed position, cover 18 may rest upon the upper surfaces of side walls 13 and/or rib members 14 to cover channels 16 and to protect any cables housed therein.

As illustrated in FIG. 1, base member 12 may also comprise one or more connectors 32 configured to removably attach cable protector 10 to a side of first side ramp 40. In many embodiments, connectors 32 are substantially vertically oriented; that is, they extend generally perpendicular to the horizontal plane defined by cover 18. Although connectors 32 are illustrated in FIG. 1 as extending generally downwards towards the ground, connectors 32 may also be configured to extend generally up and away from the ground. Generally speaking, connectors 32 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to "snap fit" into a complimentary recess, or the like.

In at least one embodiment, connectors 32 are configured to be insertable into one or more apertures 46 formed in first side ramp 40. In many embodiments apertures 46 are defined within first side ramp 40 so as to be substantially vertically oriented. According to this exemplary embodiment, apertures 46 are defined in a general slot shape that embodies the inverse of the dimensions of connectors 32. Alternatively, apertures 46 may be formed of any number of other shapes capable of receiving the various possible configurations of connectors 32 (described in greater detail above); including, for example, a circular socket (capable of interlocking with the ball-shaped embodiment of connector 32), a cubic or rectangular aperture or recess (capable of receiving the substantially vertical protrusion embodiment of connector 32), or the like. Connectors 32 may also be configured to snap fit into apertures 46 defined in first side ramp 40 to removably attach first side ramp 40 to cable protector 10.

In at least one embodiment, first side ramp 40 comprises a tapered structure having one or more male end connectors 42 formed on one of its ends, and one or more female end connectors 44 formed on its opposing end. Additionally or alternatively, one or male end connectors 42 and one or more female end connectors 44 may be provided on the same end of first side ramp 40. Although illustrated in FIGS. 1-3 as being formed in a general hourglass shape, end connectors 42, 44 may be formed of any shape or connecting structure known to those in the art; including, for example, complimentary block-shaped connectors, so-called tongue-and-groove connectors, so-called dogbone-shaped connectors, T-shaped connectors, and the like.

According to at least one embodiment, cable protector 10 is removably attached to first side ramp 40 by: 1) elevating cable protector 10; 2) positioning connectors 32 of cable protector 10 directly over apertures 46 defined in first side ramp 40; 3) inserting connectors 32 into apertures 46; and 4) lowering cable protector 10. Persons of skill the art will recognize that any number of alternative methods and/or sequences may be used to removably attach cable protector 10 to first side ramp 40, particularly in light of the various possible shapes, structures, and configurations of connectors 32 and apertures 46.

As illustrated in the exemplary embodiments illustrated in FIGS. 1-2, second side ramp 50 may be removably attached to a side of cable protector 10 that opposes the side attached to first side ramp 40. Similar to first side ramp 40, second side ramp 50 may comprise a tapered structure having one or more male end connectors 52 and one or more female end connectors 54 formed on its ends. Generally speaking, end connectors 52, 54 may be formed of any shape or connecting structure known to those in the art; including, for example, hourglass-shaped connectors, complimentary block-shaped connectors, so-called dogbone-shaped connectors, so-called tongue-and-groove connectors, T-shaped connectors, and the like.

As illustrated in FIGS. 1-2, second side ramp 50 may also comprise one or more connectors 56 formed along a substantially vertical side wall that opposes its tapered side. In many embodiments, connectors 56 are substantially vertically oriented. Although connectors 56 are illustrated in FIG. 1 as extending generally downwards towards the ground, connectors 56 may also be configured to extend generally up and away from the ground. As with connectors 32, connectors 56 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to snap fit into a complimentary recess, or the like.

In at least one embodiment, connectors 56 are configured to be insertable into one or more apertures 34 formed in base member 12 of cable protector 10. In many embodiments apertures 34 are defined within base member 12 so as to be substantially vertically oriented; that is, apertures 34 may be defined within base member 12 so as to extend generally perpendicular to the horizontal plane defined by cover 18. In the exemplary embodiment illustrated in FIG. 1, apertures 34 are defined in a general slot shape that embodies the inverse of the dimensions of connectors 56. Alternatively, as with apertures 46, apertures 34 may be formed of any number of other shapes capable of receiving the various possible configurations of connectors 56 (described in greater detail above); including, for example, a circular socket (capable of interlocking with the ball-shaped embodiment of connector 56), a cubic or rectangular aperture or recess (capable of receiving the substantially vertical protrusion embodiment of connector 56), or the like. Connectors 56 may also be configured to snap fit into apertures 34 defined in cable protector 10 to removably attach second side ramp 50 to cable protector 10.

According to at least one embodiment, second side ramp 50 is removably attached to cable protector 10 by: 1) elevating second side ramp 50; 2) positioning connectors 56 of second side ramp 50 directly over apertures 34 defined in base member 12 of cable protector 10; 3) inserting connectors 56 into apertures 34; and 4) lowering second side ramp 50. Persons of skill the art will recognize that any number of alternative methods and/or sequences may be used to removably attach second side ramp 50 to cable protector 10, particularly in light of the various possible shapes, structures, and configurations of connectors 56 and apertures 34.

Figure 3:
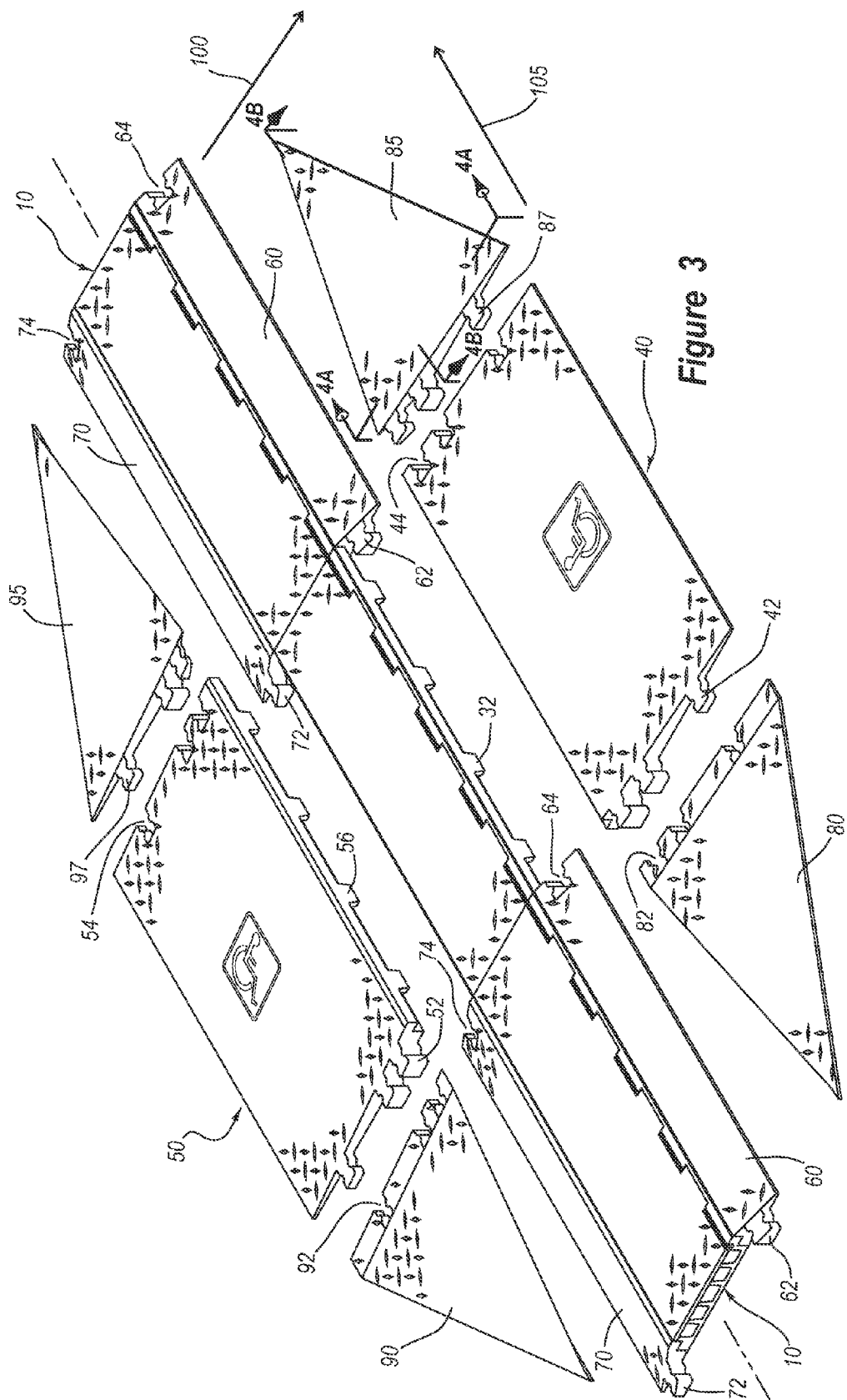
FIG. 3 is a partially assembled perspective view of the exemplary cable protection system illustrated in FIG. 1, further comprising a plurality of exemplary tapered transition structures.
Figure 5:
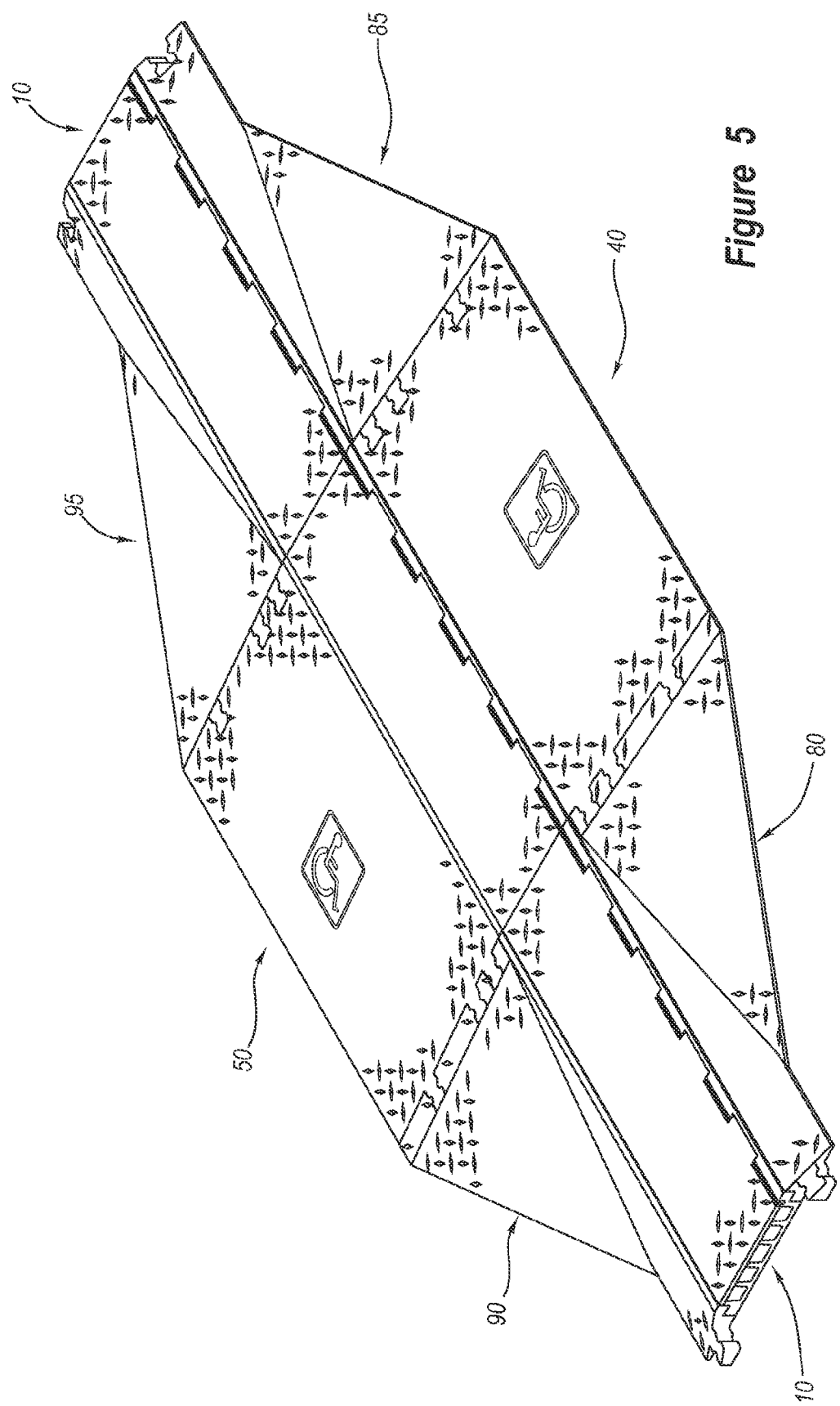
FIG. 5 is an assembled perspective view of the exemplary cable protection system illustrated in FIG. 3.

FIG. 3 is a partially assembled perspective view of the exemplary cable protection system illustrated in FIGS. 1-2, further comprising a plurality of exemplary tapered transition structures. FIG. 5 is an assembled perspective view of the exemplary cable protection system illustrated in FIG. 3. As illustrated in these figures, a plurality of cable protectors 10 may be removably attached together in an end-to-end fashion to extend the exemplary cable protection system across roadways or walkways of varying widths and/or to accommodate cables of varying lengths. In addition, one or more side ramps 60, 70 may be removably attached to these additional cable protectors 10 in a manner similar to ramps 40, 50. In at least one embodiment, side ramps 60, 70 are configured to have a slope that is significantly steeper than the slope of first and second side ramps 40, 50. Similar to first and second side ramps 40, 50, side ramps 60, 70 may additionally comprise one or more male end connectors 62, 72 and one or more female end connectors 64, 74 for facilitating the end-to-end connection of one or more ramps and/or one or more cable protectors. As with the end connectors described in connection with previous embodiments, male end connectors 62, 72 and/or female end connectors 64, 74 may be formed on each opposing end of ramps 60, 70. In addition, although illustrated in FIG. 3 as being formed in a general hourglass shape, end connectors 62, 64, 72, and 74 may be formed of any shape or connecting structure known to those in the art; including, for example, complimentary block-shaped connectors, so-called tongue-and-groove connectors, so-called dogbone-shaped connectors, T-shaped connectors, and the like.

As illustrated in FIG. 3, this exemplary cable protection system may further comprise a plurality of tapered transition structures 80, 85, 90, and 95 removably attachable to the ends of ramps 40, 50. In at least one embodiment, tapered transition structures 80, 85, 90, and 95 comprise one or more male end connectors 87, 97 and/or one or more female end connectors 82, 92 to facilitate the removable attachment of tapered transition structures 80, 85, 90, and 95 to first and second side ramps 40, 50. For example, as illustrated in FIGS. 3 and 5, tapered transition structure 80 may comprise one or more female end connectors 82 configured to receive the complimentary-shaped male end connectors 42 formed on an end of first side ramp 40, while tapered transition structure 90 may comprise one or more female end connectors 92 configured to receive the complimentary-shaped male end connectors 52 formed on an end of second side ramp 50. Similarly, tapered transition structure 85 may comprise one or more male end connectors 87 configured to be insertable into the complimentary-shaped female end connectors 44 defined in an end of first side ramp 40, while tapered transition structure 95 may comprise one or more male end connectors 97 configured to be insertable into the complimentary-shaped female end connectors 54 defined in an end of second side ramp 50.

As illustrated in FIGS. 3 and 5, tapered transition structures 80, 85, 90, and 95 may taper in both a first direction and a second direction. For example, as illustrated in FIGS. 3, 4A (which is an end view of tapered transition structure 85, taken along line 4A-4A in FIGS. 3), and 4B (which is a side view of tapered transition structure 85, taken along line 4B-4B in FIG. 3), exemplary tapered transition structure 85 may taper in both a first direction 100 and a second direction 105. In at least one embodiment, first direction 100 is substantially orthogonal to second direction 105. In the exemplary embodiment illustrated in FIGS. 3-5, tapered transition structures 80, 85, 90, and 95 are configured to be substantially triangular in shape.

As best illustrated in FIGS. 4A and 4B, tapered transition structure 85 may comprise a top surface 86, a bottom surface 88, and an overlapping side portion 89. In certain embodiments, bottom surface 88 is configured to extend substantially parallel to, and rest evenly upon, a surface (such as the ground) below structure 85. Similarly, bottom surface 88 may be configured to be substantially level with the bottom surfaces of cable protector 10 and ramps 40, 50. Thus, when tapered transition structure 85 is removably attached to an end of first side ramp 40 (as illustrated in FIG. 5), the bottom surfaces of tapered structure 85 and first side ramp 40 may form a continuous, unitary bottom surface, enabling the combined assembly to evenly rest on the surface below.

In at least one embodiment, overlapping side portion 89 is configured to laterally overlap at least a portion of side ramps 60 and/or 70. For example, overlapping side portion 89 may be configured to have a slope substantially equal to the slope of ramps 60, 70, such that, when the exemplary cable protection system is completely assembled (as illustrated in FIG. 5), overlapping side portion 89 overlaps and evenly rests upon at least a portion of ramp 60, with bottom surface 88 of tapered transition structure 85 evenly resting upon the surface below the assembled cable protection system. In other words, overlapping side portion 89 may be configured such that, when the exemplary cable protection system is completely assembled, as illustrated in FIG. 5, all major gaps are eliminated between both: 1) overlapping side portion 89 and side ramp 60; and 2) bottom surface 88 of structure 85 and the surface (such as the ground) below the assembled cable protection system.

In at least one embodiment, top surface 86 of tapered structure 85 is configured to be substantially planar (i.e., flat or even, though not level). In other words, as illustrated in FIGS. 3-5, the entirety of tapered transition structure 85 may be configured to evenly taper in both first direction 100 and second direction 105, resulting in top surface 86 having a substantially flat or even surface to provide a smooth transition from cable protector 10 and/or first side ramp 40 to the ground below.

As with tapered transition structure 85, structures 80, 90, and 95 may comprise a top surface, a bottom surface, and an overlapping side portion. Similar to top surface 86, the top surfaces of these structures may be configured to evenly taper in both a first direction and a second direction, resulting in a substantially planar surface. The bottom surfaces of these structures, as with bottom surface 88, may be configured to extend substantially parallel to, and rest evenly upon, a surface (such as the ground) below the structures. In addition, the overlapping side portions of these structures may be configured to laterally overlap at least a portion of side ramps 60 and/or 70.

Generally speaking, exemplary tapered transition structures 80, 85, 90, and 95 effectively eliminate the need for conventional side ramps by providing a gradual transition between drop-offs present along the edges of conventional cable protection systems. Specifically, when the exemplary cable protection system is fully assembled (as illustrated in FIG. 5), tapered transition structures 80, 85, 90, and 95 simultaneously provide a smooth and gradual transition between: 1) the ends of ramps 40, 50 and the surface below the cable protection system; 2) the sides of cable protectors 10 and the surface below the cable protection system; and 3) the ends of ramps 40, 50 and the top surfaces of ramps 60, 70. Wheelchairs, walkers, strollers, and the like may thus approach and cross over the assembled cable protection system from a wide range of directions and angles without fear of falling off the edge of the ramp or cable protector and without fear of running into vertically extending protrusions, such as conventional side rails. Tapered transition structures 80, 85, 90, and 95 thus simply and safely eliminate the need for conventional side rails.

Figure 6:
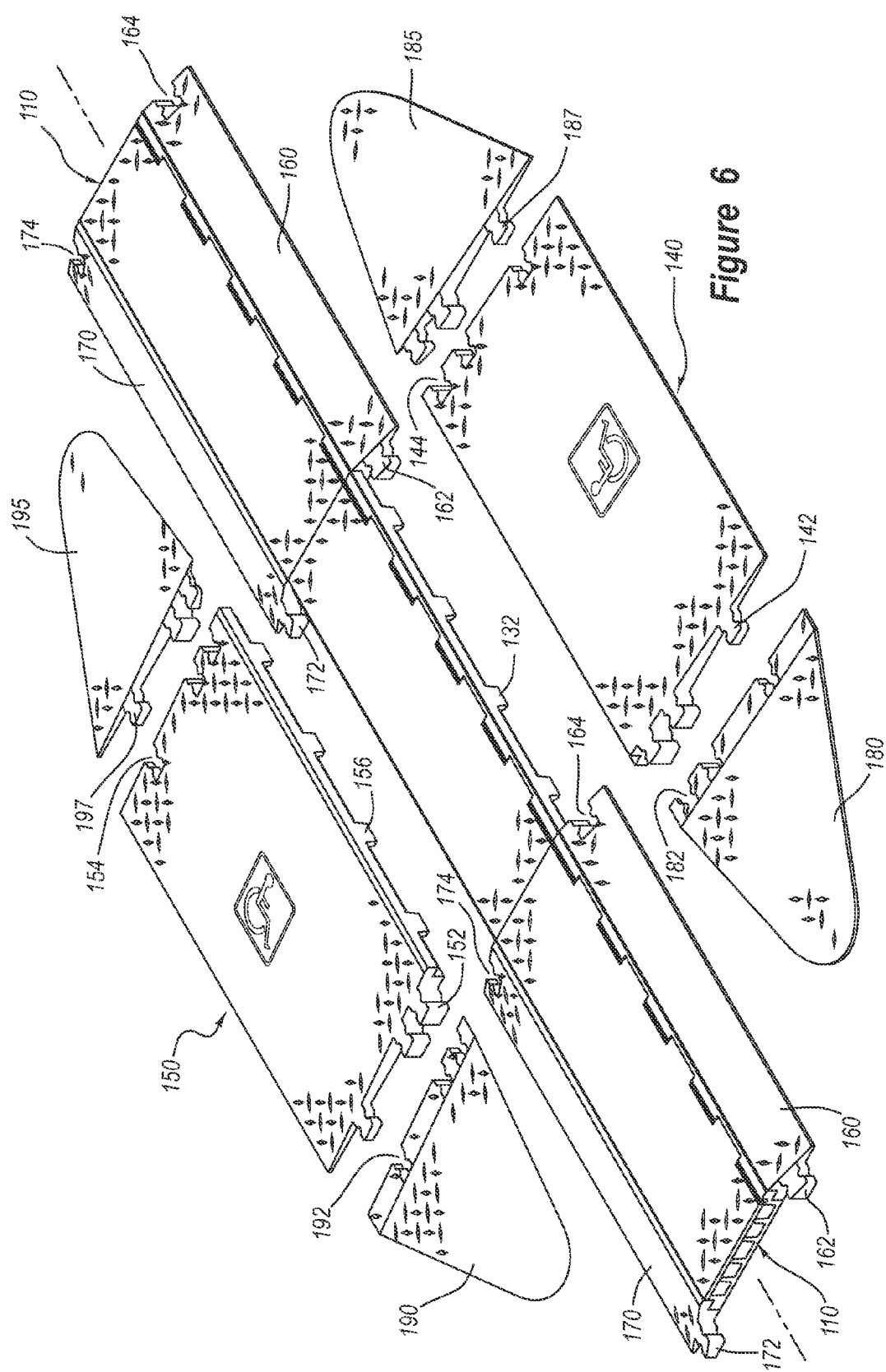
FIG. 6 is a partially assembled perspective view of an exemplary cable protection system according to an additional embodiment.

Although the various elements of the exemplary cable protection systems illustrated in FIGS. 1-5 have been described and illustrated with a certain degree of particularity, persons of ordinary skill in the art will appreciate that each element in this exemplary system may be formed in any number of suitable shapes and sizes. In particular, although tapered transition structures 80, 85, 90, and 95 have been described and illustrated herein as being substantially triangular in shape, these transition structures may be formed in any number of other suitable shapes and sizes, such as a square, rectangle, semicircle, or the like. For example, as illustrated in FIG. 6, in at least one embodiment tapered transition structures 180, 185, 190, and 195 may comprise at least one rounded end. Tapered transition structures 180, 185, 190, and 195 and ramps 140, 150, 160, and 170 may also be modified to have a more gradual or less gradual slope, as desired.

Figure 7:
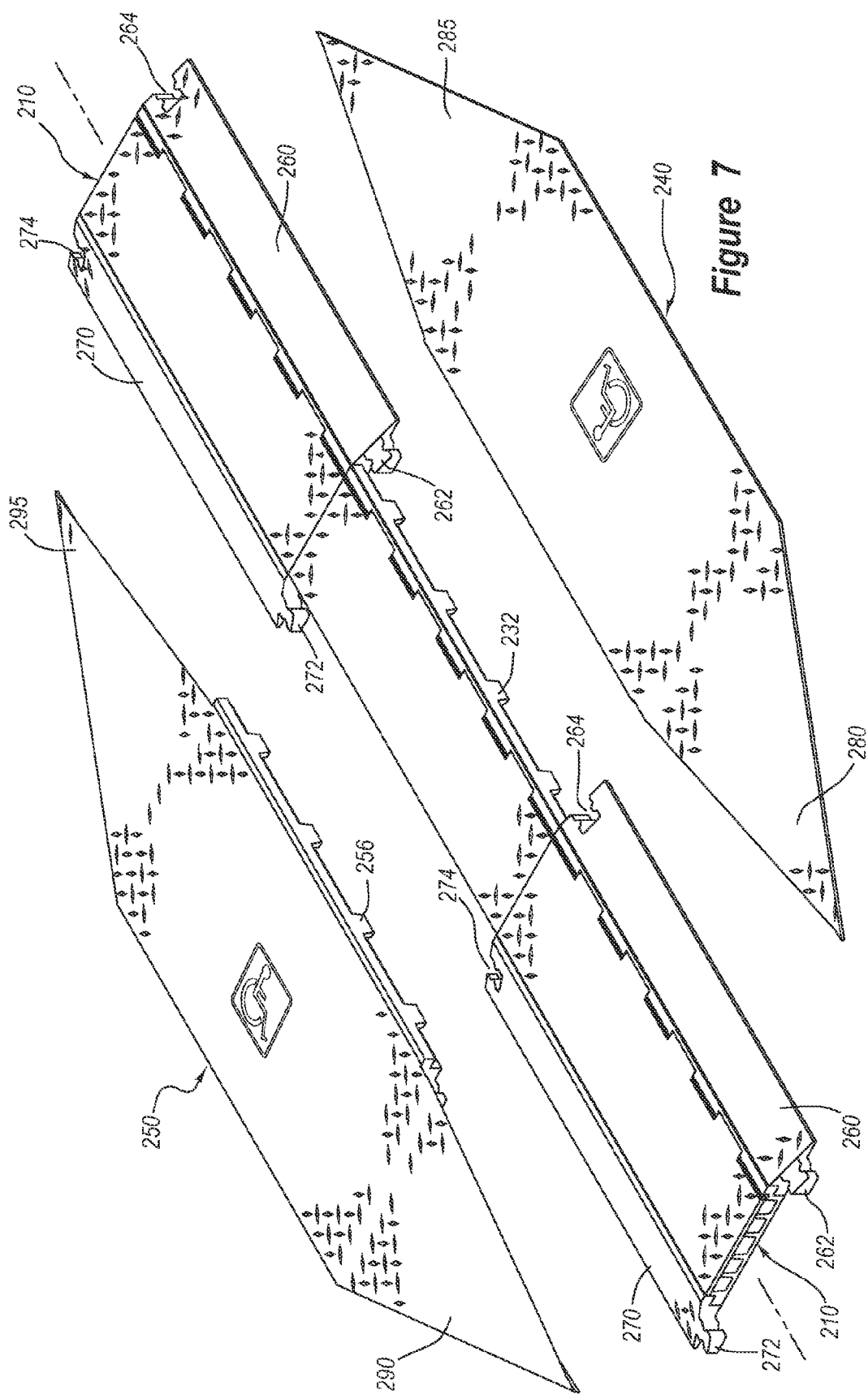
FIG. 7 is a partially assembled perspective view of an exemplary cable protection system according to an additional embodiment.

Additionally or alternatively, one or more of the elements described and illustrated in connection with FIGS. 1-6 may be integrally formed with, as opposed to being removably attached to, one another. For example, as illustrated in FIG. 7, tapered transition structures 280 and 285 may be integrally formed with first side ramp 240, as opposed to being removably attachable thereto (as with tapered transition structures 80 and 85 illustrated in FIGS. 3-5). Similarly, tapered transition structures 290 and 295 may be integrally formed with second side ramp 250, as opposed to being removably attachable thereto (as with tapered transition structures 90 and 95 illustrated in FIGS. 3-5). One or more of ramps 240, 250, 260, and 270 may also be integrally formed with, as opposed to being removably attachable to, cable protectors 210.

In an additional embodiment, one or more tapered transition structures may be pivotally attached to a side ramp. For example, as illustrated in the exploded top and bottom perspective views illustrated in FIGS. 8 and 9, respectively, one or more tapered transition structures 390, 395 may be pivotally attached to a side ramp 350. As with previous embodiments, side ramp 350 may be removably attachable to a cable protector or cable protection system, such as cable protector 10 illustrated in FIG. 2.

Figure 9:
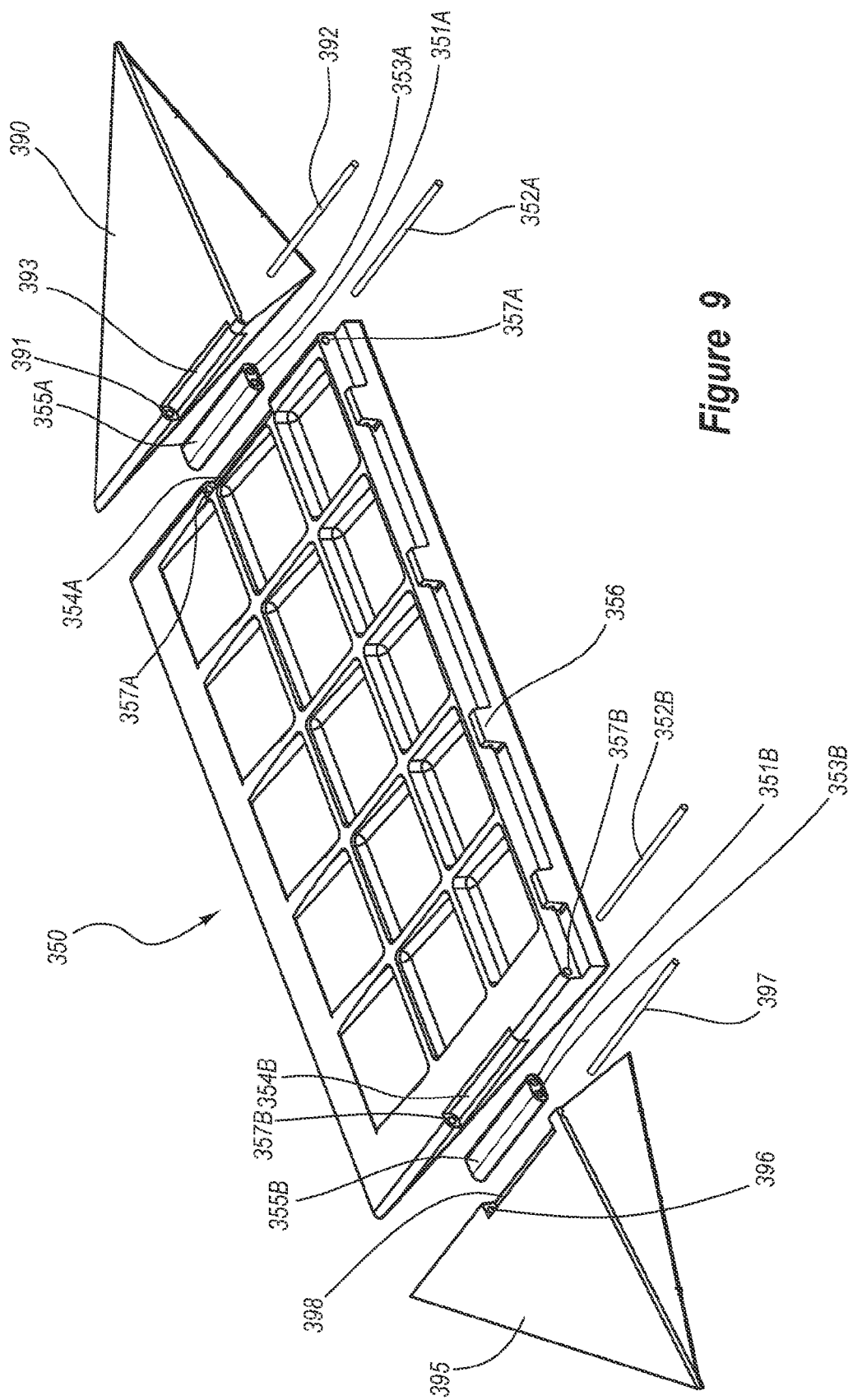
FIG. 9 is an exploded bottom perspective view of the exemplary side ramp assembly illustrated in FIG. 8.

Tapered transition structures 390 and 395 may be pivotally attached to side ramp 350 in any number of ways using any number of structures. For example, as illustrated in FIG. 9, tapered transition structures 390 and 395 may be pivotally attached to side ramp 350 using one or more hinge structures 355A and 355B, which generally represent any type of hinge structure capable of pivotally attaching tapered transition structures 390 and 395 to side ramp 350. Additionally or alternatively, tapered transition structures 390 and 395 may be pivotally attached to side ramp 350 using a flush hinge assembly, a barrel hinge assembly, a butt hinge assembly, a concealed hinge assembly, or any other structure or assembly capable of pivotally attaching tapered transition structures 390 and 395 to side ramp 350.

In at least one embodiment, a hinge structure 355A may be partially disposed within a complimentary-shaped recess 393 defined in tapered transition structure 390. Similarly, an additional hinge structure 355B may be partially disposed within a complimentary-shaped recess 398 defined in tapered transition structure 395. In certain embodiments, hinge structure 355A may be retained within recess 393 and coupled to tapered transition structure 390 by inserting a first rod member 392 through both a cylindrical passageway 391 defined in tapered transition structure 390 and a first cylindrical aperture 353 defined in hinge structure 355A. Similarly, hinge structure 355B may be retained within recess 398 and coupled to tapered transition structure 395 by inserting a first rod member 397 through both a cylindrical passageway 396 defined in tapered transition structure 395 and a first cylindrical aperture 353 defined in hinge structure 355B.

Tapered transition structure 390 may then be pivotally attached to side ramp 350 by positioning hinge structure 355A within a recess 354A defined in side ramp 350 and inserting a second rod member 352A through both a cylindrical passageway 357A defined in side ramp 350 and a second cylindrical aperture 351A defined in hinge structure 355A. Similarly, tapered transition structure 395 may be pivotally attached to side ramp 350 by positioning hinge structure 355B within a recess 354B defined in side ramp 350 and inserting a second rod member 352B through both a cylindrical passageway 357B defined in side ramp 350 and a second cylindrical aperture 351B defined in hinge structure 355B.

Figure 8:
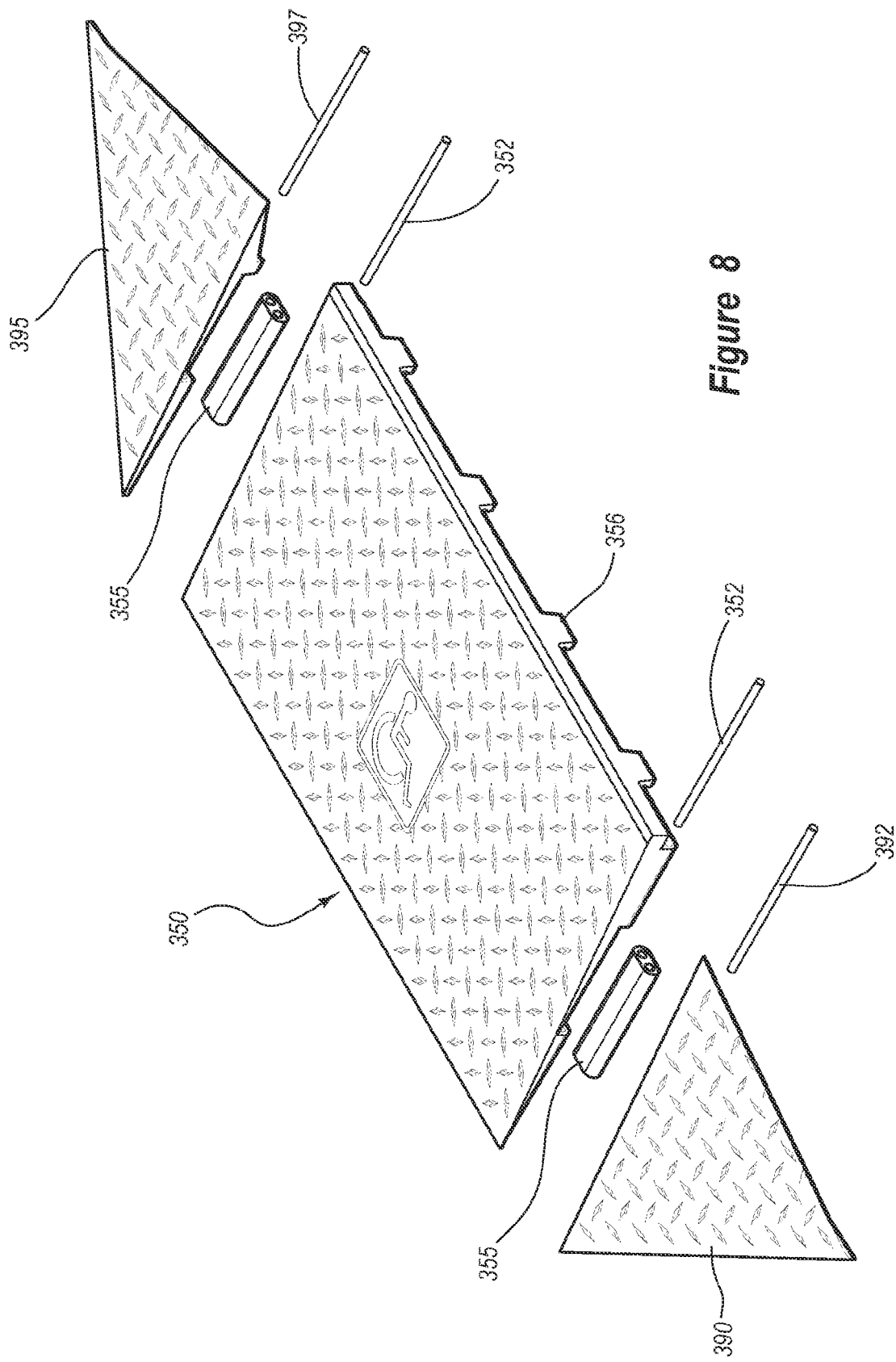
FIG. 8 is an exploded top perspective view of an exemplary side ramp assembly for a cable protection system according to at least one embodiment.
Figure 10:
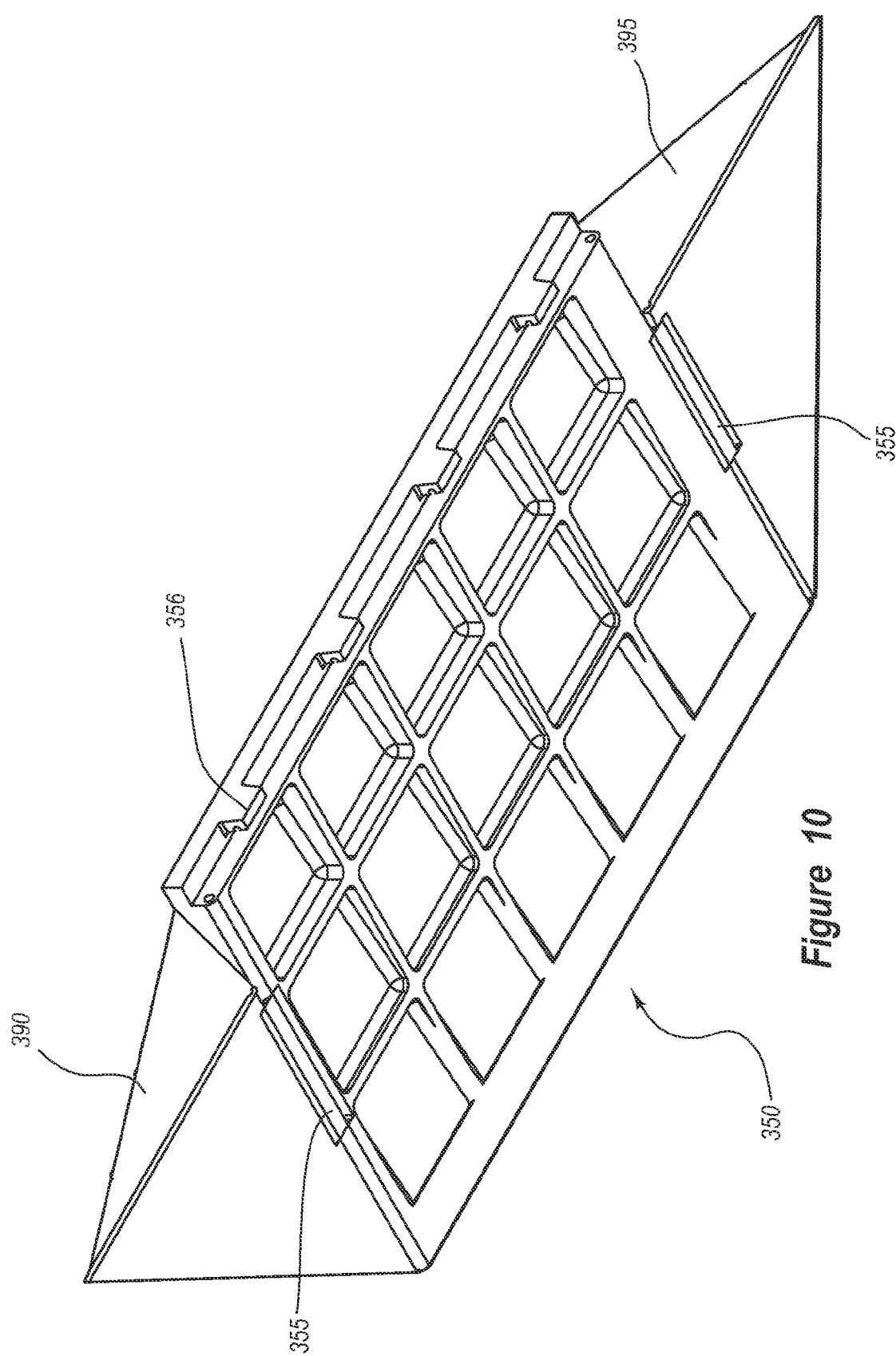
FIG. 10 is an assembled bottom perspective view of the exemplary side ramp assembly illustrated in FIG. 8.

In at least one embodiment, the various elements of the hinge assembly illustrated in FIGS. 8-10 may enable tapered transition structures 390 and 395 to freely pivot relative to side ramp 350. For example, as illustrated in the cross-sectional side views of FIGS. 11B and 11C, tapered transition structures 390 and 395 may pivot from a first open position (illustrated in FIGS. 11A and 11B) to a second closed position (illustrated in FIG. 11C). When in a closed position, the bottom surfaces of tapered transition structures 390 and 395 may rest upon the bottom surfaces of side ramp 350.

Figure 12:
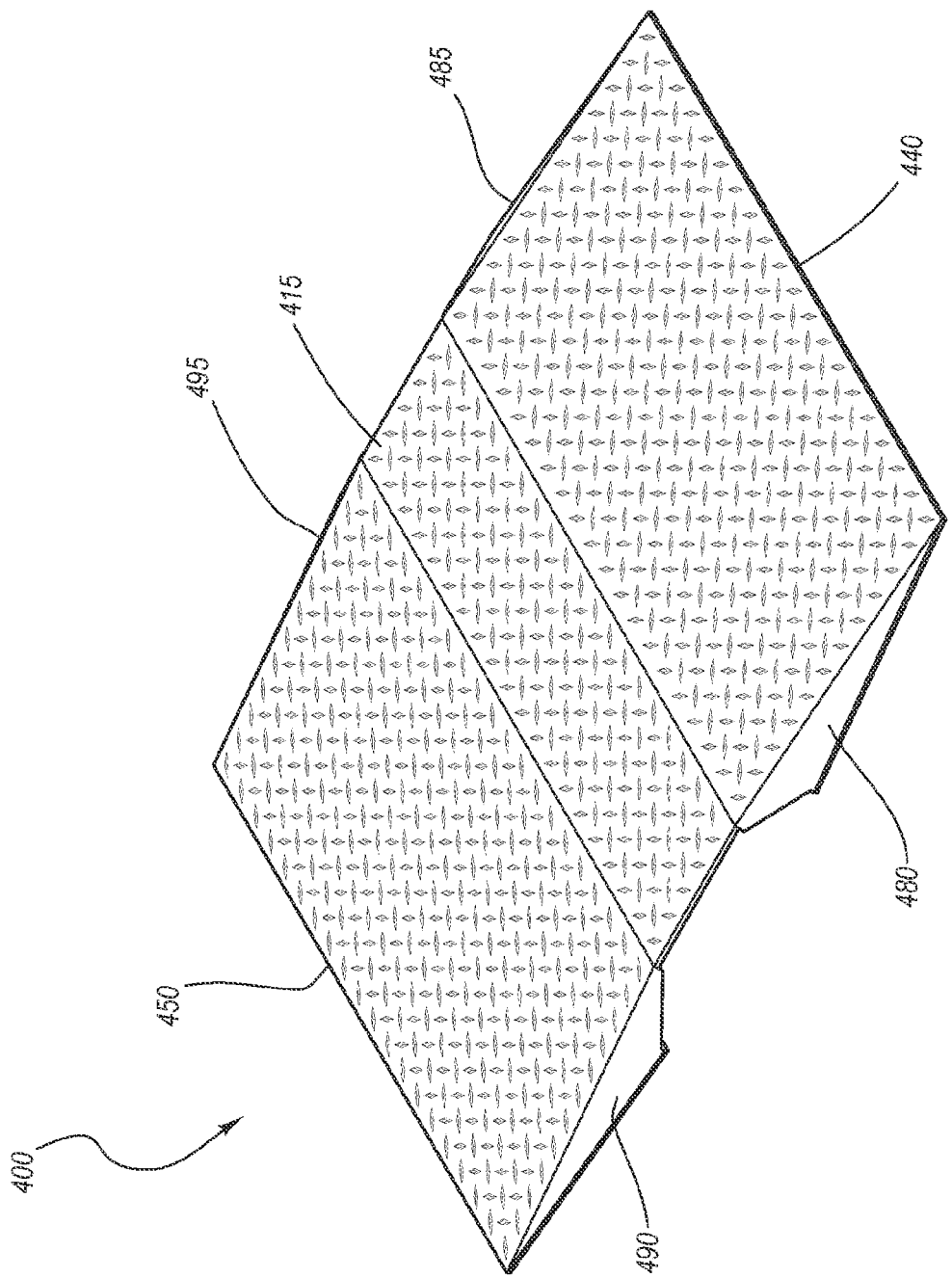
FIG. 12 is a perspective view of an exemplary ramp structure for a cable protection system according to at least one embodiment.
Figure 13:
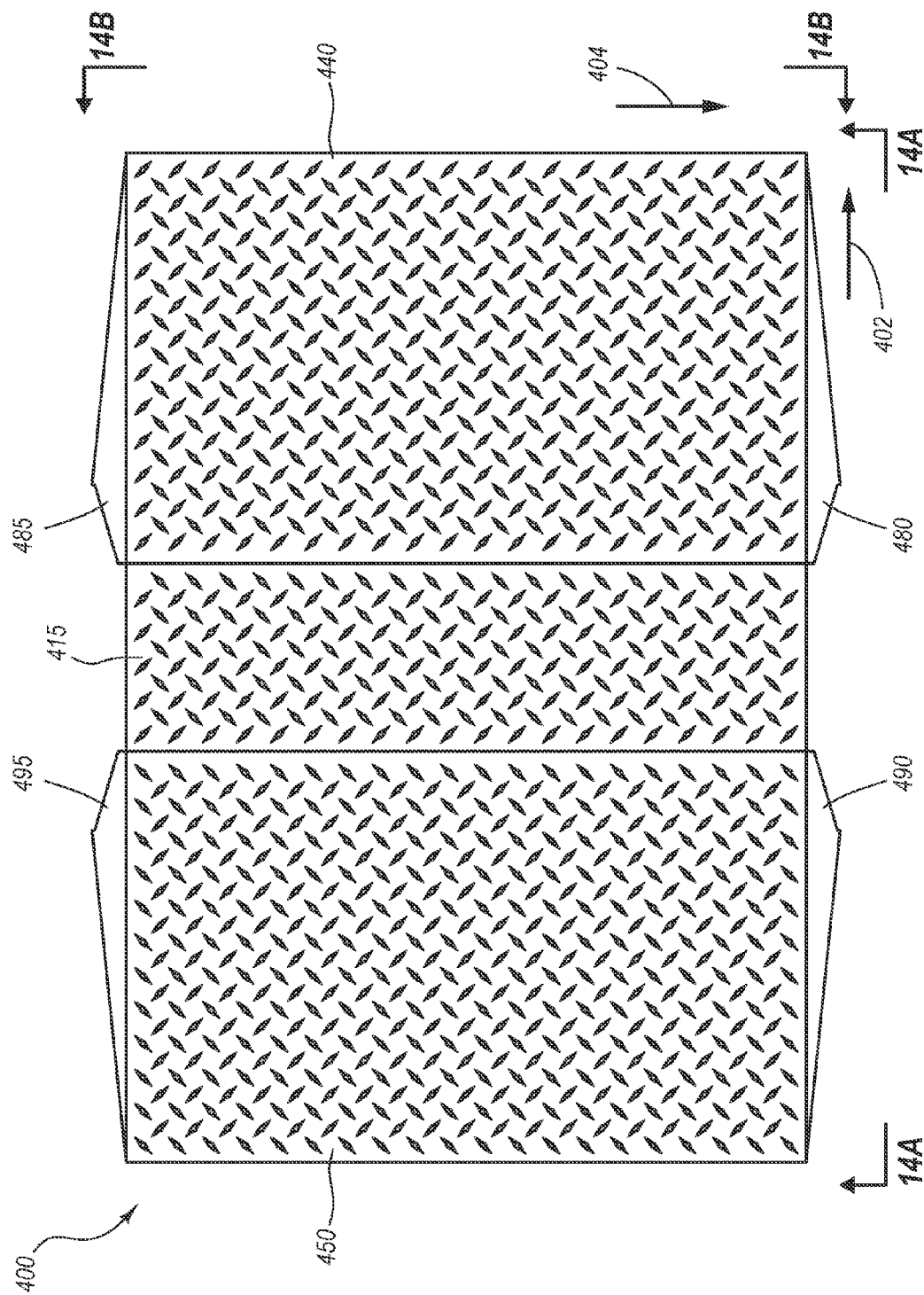
FIG. 13 is a top view of the exemplary ramp structure illustrated in FIG. 12.

As detailed above, one or more of the elements described and illustrated herein may be integrally formed with, as opposed to being removably attached to, one another. For example, as illustrated in the perspective and top views illustrated in FIGS. 12 and 13, respectively, an exemplary ramp structure 400 may comprise a first side ramp portion 440 and a second side ramp portion 450 integrally formed with a center portion 415, to form a bridge structure over a cable protector housing. Exemplary ramp structure 400 may also comprise a plurality of tapered transition portions 480 and 485 integrally formed with first side ramp portion 440 and a plurality of tapered transition portions 490 and 495 integrally formed with second side ramp portion 450. Tapered transition portions 480, 485, 490, and 495 may be formed in any shape or size. For example, as illustrated in FIGS. 12-13, tapered transition portions 480, 485, 490, and 495 may be substantially triangular in shape.

Figure 14A:
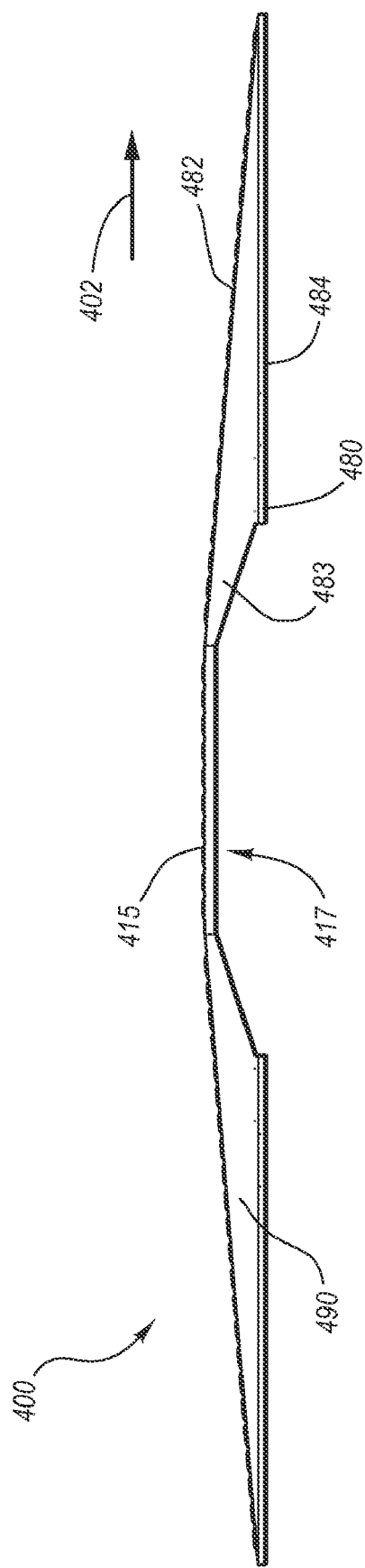
FIG. 14A is an end view of the exemplary ramp structure illustrated in FIG. 13, taken along line 14A-14A.

As with the tapered transition structures illustrated in FIGS. 3-11, tapered transition portions 480, 485, 490, and 495 may taper in both a first direction and a second direction. For example, as illustrated in FIGS. 13, 14A (which is an end view of exemplary ramp structure 400, taken along line 14A-14A in FIGS. 13), and 14B (which is a side view of exemplary ramp structure 400, taken along line 14B-14B in FIG. 13), exemplary tapered transition portion 480 may taper in both a first direction 402 and a second direction 404. In at least one embodiment, first direction 402 is substantially orthogonal to second direction 404.

Figure 14B:
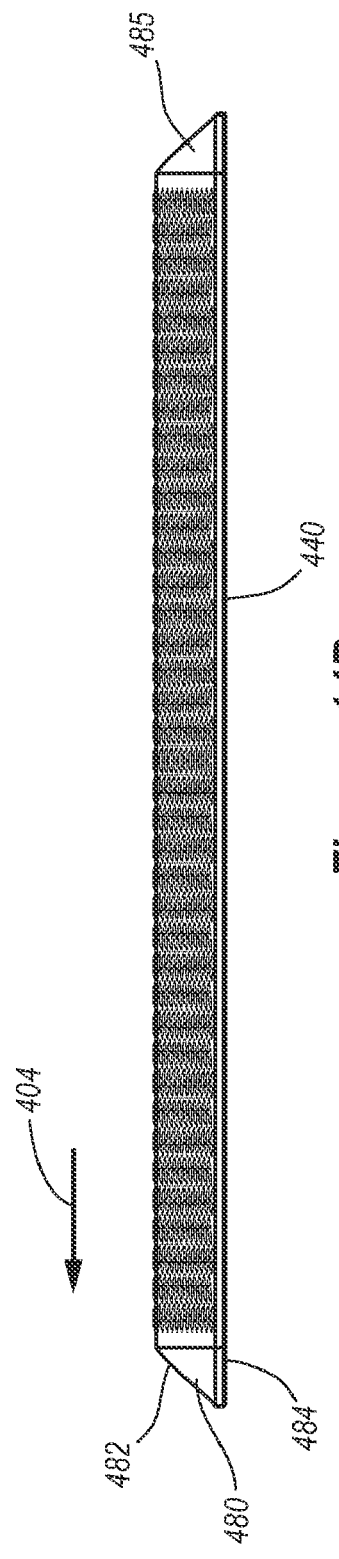
FIG. 14B is a side view of the exemplary ramp structure illustrated in FIG. 13, taken along line 14B-14B.

As best illustrated in FIGS. 14A and 14B, tapered transition portion may comprise a top surface 482, a bottom surface 484, and an overlapping side portion 483. In certain embodiments, bottom surface 484 is configured to extend substantially parallel to, and rest evenly upon, a surface (such as the ground) below ramp structure 400. Thus, the bottom surfaces of tapered transition portion 480 and first side ramp portion 440 may form a continuous, unitary bottom surface, enabling ramp structure 400 to evenly rest on the surface below.

Figure 15:
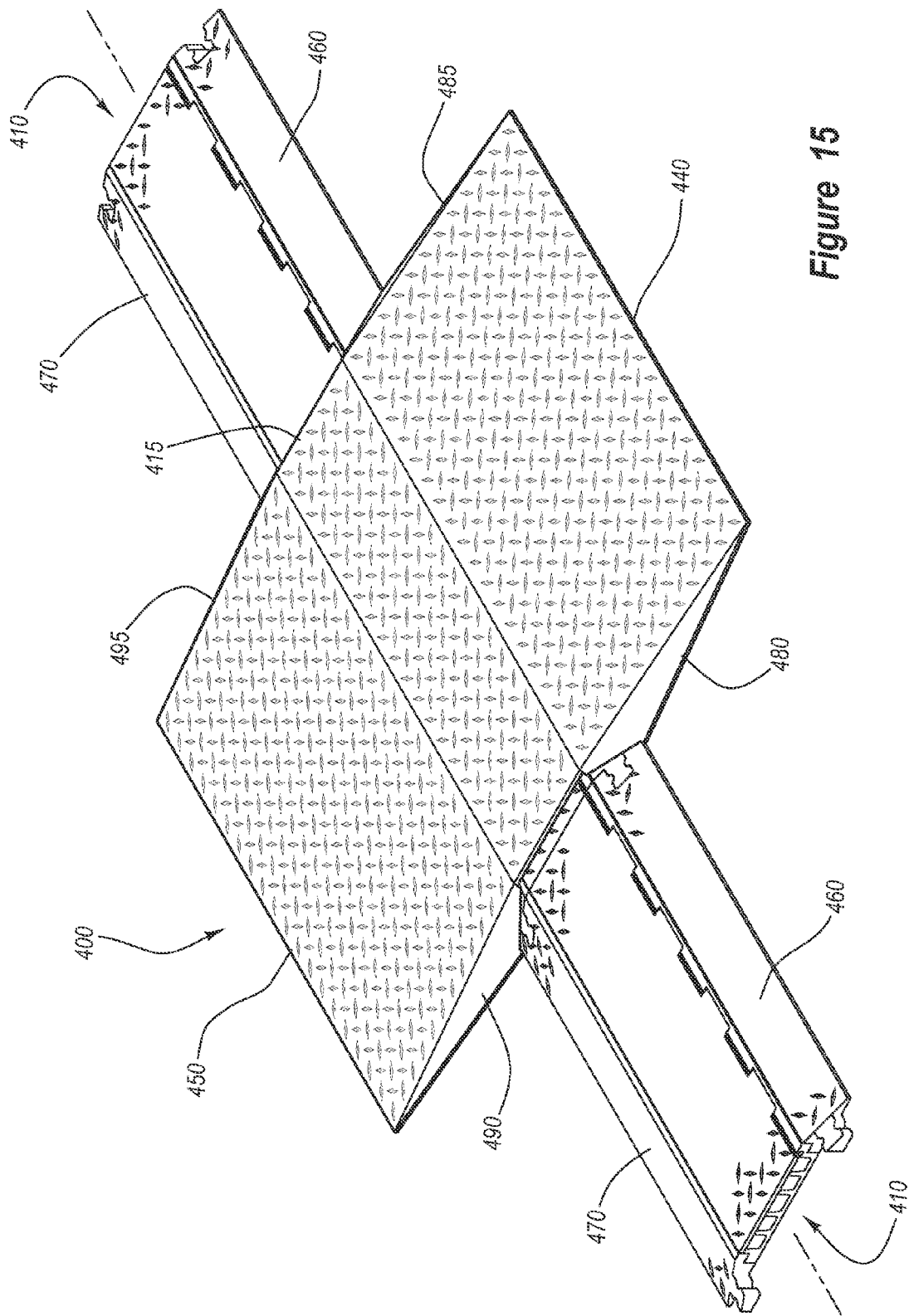
FIG. 15 is a perspective view of an exemplary ramp structure positioned over a cable protection system according to at least one embodiment.

In at least one embodiment, ramp structure 400 may be configured to be positioned over at least a portion of an additional cable protector or cable protection system. For example, as illustrated in FIGS. 14A and 15, a recess 417 configured to receive a portion of an additional cable protector or cable protection system may be defined on the underside of ramp structure 400. Accordingly, ramp structure 400 provides a bridge from one side of a cable protector to another, with a ramp on each side ending at approximately a support surface level. In at least one embodiment, the overlapping side portions of tapered transition portions 480, 485, 490, and 495 that define recess 417 may be configured to laterally overlap at least a portion of an additional cable protector or cable protection system, such as cable protector 410 and/or ramps 460 and 470. For example, as illustrated in FIG. 15, overlapping side portion of tapered transition portion 480 may be configured to have a slope substantially equal to the slope of ramp 460 attached to exemplary cable protector 410, such that, when cable protector 410 and ramps 460, 470 are positioned within recess 417 of ramp structure 400, overlapping side portion 483 overlaps and evenly rests upon at least a portion of ramp 460, with bottom surface 484 of tapered transition portion 480 evenly resting upon the support surface below cable protector 410 and ramp structure 400. In other words, overlapping side portion 483 may be configured such that, when ramp structure 400 is positioned over cable protector 410 and ramps 460 and 470, as illustrated in FIG. 15, all major gaps are eliminated between both: 1) overlapping side portion 483 and ramp 460; and 2) bottom surface 484 of tapered transition portion 480 and the support surface (e.g., the ground) below the assembled cable protection system.

In at least one embodiment, top surface 482 of tapered transition portion 480 is configured to be substantially planar (i.e., flat or even, though not level). In other words, as illustrated in FIGS. 12 and 15, the entirety of tapered transition portion 480 may be configured to evenly taper in both first direction 402 and second direction 404, resulting in top surface 482 having a substantially flat or even surface to provide a smooth transition from ramp structure 400, cable protector 410, and/or first side ramp portion 440 to the ground below.

As with tapered transition portion 480, portions 485, 490, and 495 may comprise a top surface, a bottom surface, and an overlapping side portion. Similar to top surface 482, the top surfaces of these structures may be configured to evenly taper in both a first direction and a second direction, resulting in a substantially planar surface. The bottom surfaces of these structures, as with bottom surface 484, may be configured to extend substantially parallel to, and rest evenly upon, a surface (such as the ground) below the structures. In addition, the overlapping side portions of these structures may be configured to laterally overlap at least a portion of ramps 460 and/or 470.

Figure 16:
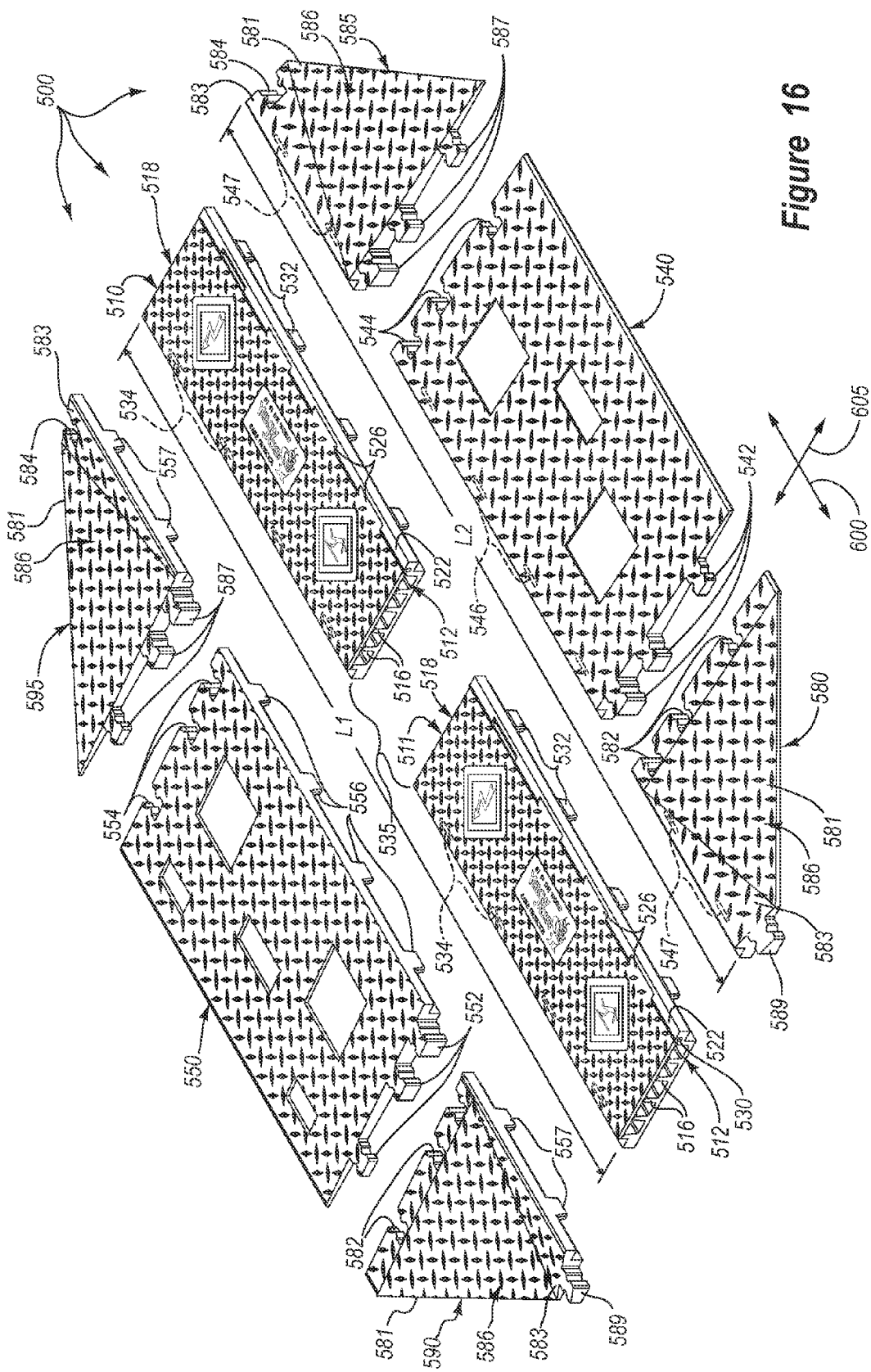
FIG. 16 is an exploded perspective view of another cable protection system according to at least one embodiment.
Figure 17:
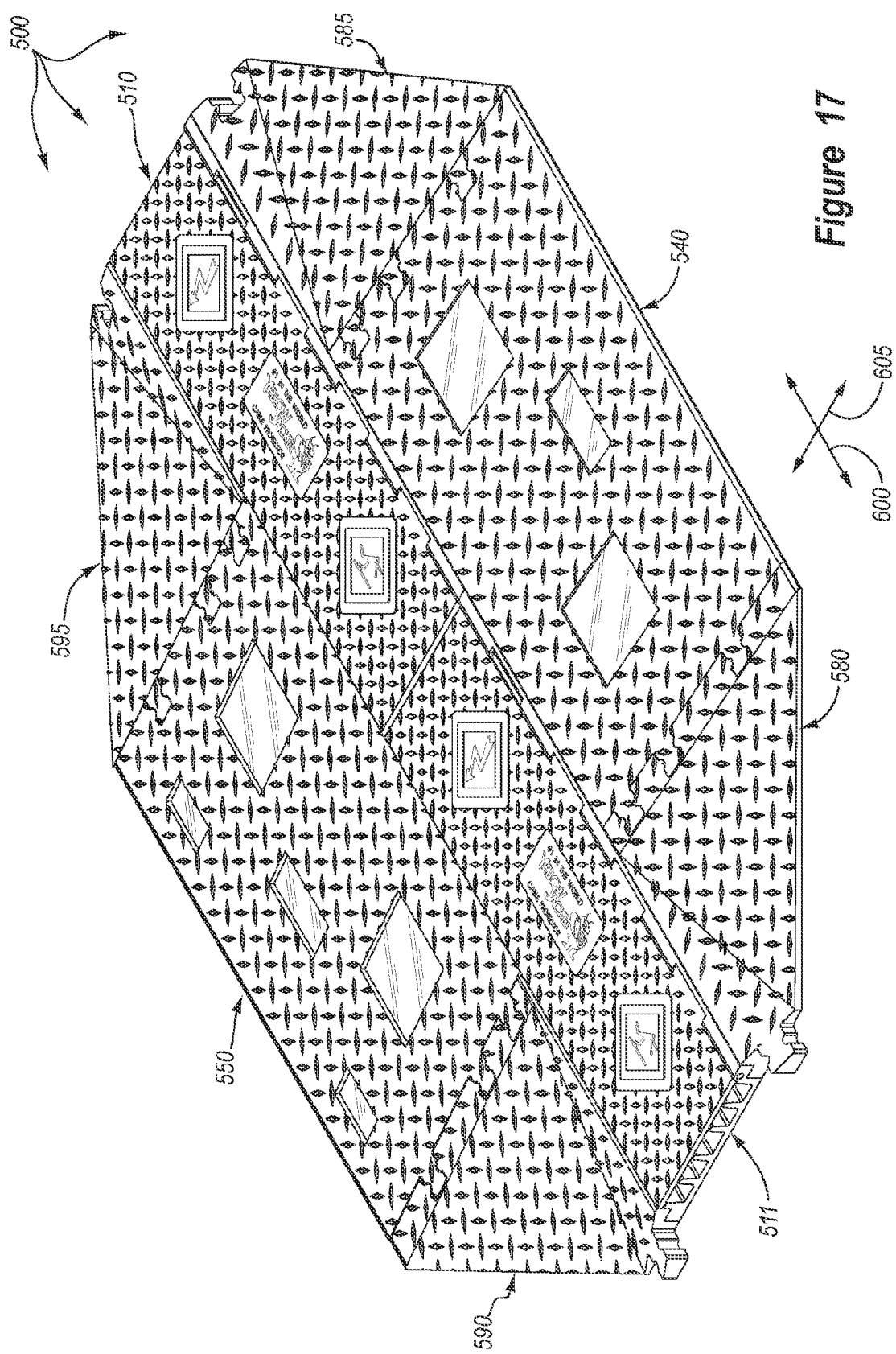
FIG. 17 is a perspective view of the cable protection system illustrated in FIG. 16 assembled together.
Figure 19:
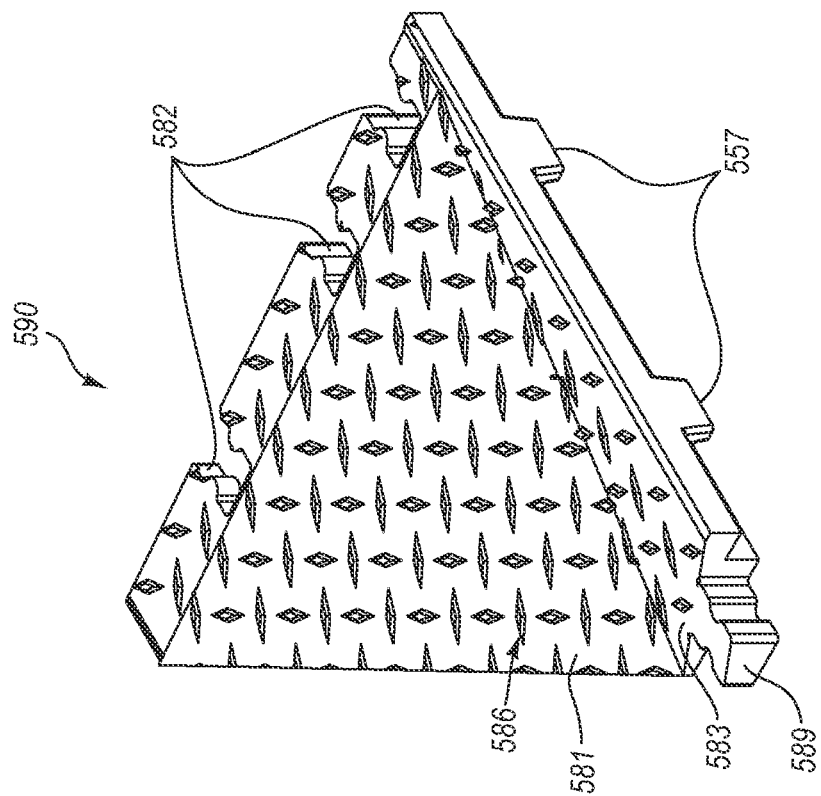
FIG. 19 is a second top perspective view of the tapered transition structure illustrated in FIG. 16.
Figure 18:
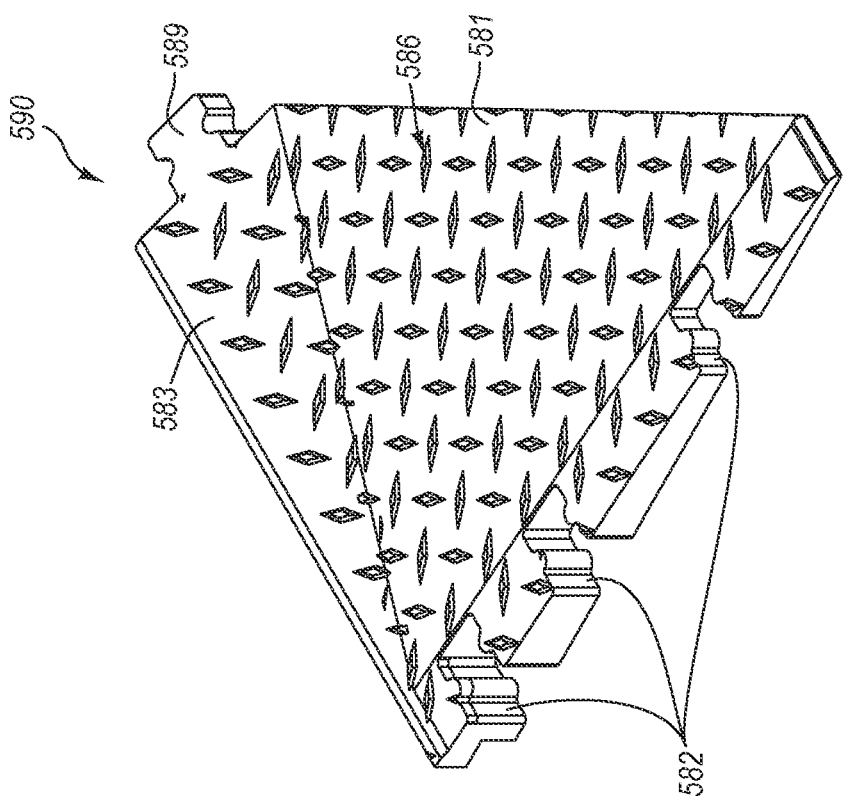
FIG. 18 is a first top perspective view of the tapered transition structure illustrated in FIG. 16.

FIG. 16 is a partially assembled perspective view of another exemplary cable protection system 500. FIG. 17 is a perspective view of the cable protection system 500 fully assembled. Cable protection system 500 includes a plurality of cable protectors 510, 511 arranged in an end-to-end fashion. An end of cable protector 510 faces and is adjacent to an end of cable protector 511 when the cable protectors 510, 511 are in the end-to-end arrangement to define a cable protector joint or interface 535. The cable protectors 510, 511 may each include a base member 512, a plurality of channels 516, and a cover member 518. The cover member 518 may be pivotally attached to the base member 512 with a set of base hinge members 522, a set of cover hinge members 526, and a rod member 530. The use of two or more cable protectors 510, 511 in an end-to-end arrangement may provide use of the cable protection system 500 in extending the across roadways or walkways of varying widths and/or to accommodate cables of varying lengths.

The cable protection system 500 may further include one or more side ramps 540, 550. The side ramps 540, 550 may be removably attached to the cable protectors 510, 511 in a manner similar to the connection arrangement of ramps 40, 50, as is discussed in further detail below. At least one of the side ramps 540, 550 may be positioned adjacent to a side surface of each of the cable protectors 510, 511. In some embodiments, at least one of the side ramps 540, 550 overlaps or spans the cable protector joint 535. Typically, at least one of the side ramps 540, 550 is removably attached to both cable protectors 510, 511. Alternatively, each of the side ramps 540, 550 is removably attached to a single one of the cable protectors 510, 511. In some embodiments, a portion of at least one of the side ramps 540, 550 is arranged adjacent to a side of one of the cable protectors 510, 511 and another portion of the same side ramp extends beyond an end of the cable protector.

The side ramps 540, 550 may be used to attach together end-to-end arranged cable protectors 510, 511. In some arrangements, one of the side ramps 540, 550 is removably attached to one or both cable protectors 510, 511, and the other side ramp is removably attached to one, both or none of the cable protectors 510, 511.

As illustrated in FIGS. 16-17, base member 512 may also comprise one or more connectors 532 configured to removably attach cable protectors 510, 511 to a side of side ramps 540, 550. In many embodiments, connectors 532 are substantially vertically oriented; that is, they extend generally perpendicular to a horizontal plane (i.e., a plane defined by a top surface of cover 518). Although connectors 532 are illustrated in FIGS. 16-17 as extending generally downwards towards the ground, connectors 532 may also be configured to extend generally up and away from the ground. Generally speaking, connectors 532 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to "snap fit" into a complimentary recess, or the like.

In at least one embodiment, connectors 532 are configured to be insertable into one or more apertures 546 formed in side ramps 540, 550. In many embodiments, apertures 546 are defined within first side ramp 540 so as to be substantially vertically oriented. According to this exemplary embodiment, apertures 546 are defined in a general slot shape that embodies the inverse of the dimensions of connectors 532. Alternatively, apertures 546 may be formed of any number of other shapes capable of receiving the various possible configurations of connectors 532 (described in greater detail above); including, for example, a circular socket (capable of interlocking with the ball-shaped embodiment of connector 532), a cubic or rectangular aperture or recess (capable of receiving the substantially vertical protrusion embodiment of connector 532), or the like. Connectors 532 may also be configured to snap fit into apertures 546 defined in side ramps 540, 550 to removably attach side ramps 540, 550 to cable protectors 510, 511.

According to at least one embodiment, cable protectors 510, 511 are removably attached to side ramps 540, 550 by: 1) elevating cable protectors 510, 511; 2) positioning connectors 532 of cable protectors 510, 511 directly over apertures 546 defined in side ramps 540, 550; 3) inserting connectors 532 into apertures 546; and 4) lowering cable protectors 510, 511. Persons of skill the art will recognize that any number of alternative methods and/or sequences may be used to removably attach cable protectors 510, 511 to side ramps 540, 550, particularly in light of the various possible shapes, structures, and configurations of connectors 532 and apertures 546.

The second side ramp 550 may also comprise one or more connectors 556 formed along a substantially vertical side wall that opposes its tapered side. In many embodiments, connectors 556 are substantially vertically oriented. Although connectors 556 are illustrated in FIGS. 16-17 as extending generally downwards towards the ground, connectors 556 may also be configured to extend generally up and away from the ground. As with connectors 532, connectors 556 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to snap fit into a complimentary recess, or the like.

In at least one embodiment, connectors 556 are configured to be insertable into one or more apertures 534 formed in base member 512 of cable protectors 510, 511. In many embodiments apertures 534 are defined within base member 512 so as to be substantially vertically oriented; that is, apertures 534 may be defined within base member 512 so as to extend generally perpendicular to a horizontal plane (i.e., a plane defined by a top surface of cover 518). In the exemplary embodiment illustrated in FIGS. 16-17, apertures 534 are defined in a general slot shape that embodies the inverse of the dimensions of connectors 556. Alternatively, as with apertures 546, apertures 534 may be formed of any number of other shapes capable of receiving the various possible configurations of connectors 556 (described in greater detail above); including, for example, a circular socket (capable of interlocking with the ball-shaped embodiment of connector 556), a cubic or rectangular aperture or recess (capable of receiving the substantially vertical protrusion embodiment of connector 556), or the like. Connectors 556 may also be configured to snap fit into apertures 534 defined in cable protectors 510, 511 to removably attach second side ramp 550 to cable protector 510.

According to at least one embodiment, second side ramp 550 is removably attached to cable protectors 510, 511 by: 1) elevating second side ramp 550; 2) positioning connectors 556 of second side ramp 550 directly over apertures 534 defined in base member 512 of cable protectors 510, 511; 3) inserting connectors 556 into apertures 534; and 4) lowering second side ramp 550. Persons of skill the art will recognize that any number of alternative methods and/or sequences may be used to removably attach second side ramp 550 to cable protectors 510, 511, particularly in light of the various possible shapes, structures, and configurations of connectors 556 and apertures 534.

The side ramps 540, 550 may each comprise one or more male end connectors 542, 552 and one or more female end connectors 544, 554 for facilitating the end-to-end connection of one or more ramps and/or one or more cable protectors and/or one or more tapered transition structures. As with the end connectors described in connection with previous embodiments, male end connectors 542, 552 and/or female end connectors 544, 554 may be formed on each opposing end of ramps 540, 550. In addition, although illustrated in FIGS. 16-17 as being formed in a general hourglass shape, end connectors 542, 552, 544, 554 may be formed of any shape or connecting structure known to those in the art; including, for example, complimentary block-shaped connectors, so-called tongue-and-groove connectors, so-called dogbone-shaped connectors, T-shaped connectors, and the like.

The cable protectors 510, 511 may be constructed similarly to the cable protectors 12 described above with reference to at least FIGS. 1-3. The side ramps 540, 550 may be constructed similarly to the cable protectors 40, 50 described above with reference to at least FIGS. 1-4.

As illustrated in FIGS. 16-19, this exemplary cable protection system 500 may further comprise a plurality of tapered transition structures 580, 585, 590, 595. The tapered transition structures 580, 585, 590, 595 may be removably attachable to the ends of ramps 540, 550. In at least one embodiment, tapered transition structures 580, 585, 590, 595 comprise one or more male end connectors 587, 589 and/or one or more female end connectors 582, 584 to facilitate the removable attachment of tapered transition structures 580, 585, 590, 595 to first and second side ramps 540, 550. For example, as illustrated in FIGS. 16-17, tapered transition structure 580 may comprise one or more female end connectors 582 configured to receive the complimentary-shaped male end connectors 542 formed on an end of first side ramp 540, while tapered transition structure 590 may comprise one or more female end connectors 582 configured to receive the complimentary-shaped male end connectors 552 formed on an end of second side ramp 550. Similarly, tapered transition structure 585 may comprise one or more male end connectors 587 configured to be insertable into the complimentary-shaped female end connectors 544 defined in an end of first side ramp 540, while tapered transition structure 595 may comprise one or more male end connectors 587 configured to be insertable into the complimentary-shaped female end connectors 554 defined in an end of second side ramp 550.

As illustrated in FIGS. 16-17, tapered transition structures 580, 585, 590, 595 may taper in both a first direction 600 and a second direction 605. For example, exemplary tapered transition structure 590 may include a top surface 586 that includes a first portion 581 tapered in the first direction 600, and a second portion 583 tapered in the second direction 605. In at least one embodiment, first direction 600 is substantially orthogonal to second direction 605. In the exemplary embodiment illustrated in FIGS. 16-17, tapered transition structures 580, 585, 590, 595 are configured to be substantially triangular in shape.

Tapered transition structures 580, 585, 590, 595 may comprise a top surface 586 and a bottom surface 588. FIGS. 18-25 illustrate the tapered transition structure 590 in perspective, top, bottom, side and end views. The other tapered transitions structures 580, 585, 595 have the same or similar features as the tapered transition structure 590. The bottom surface 588 is configured to extend substantially parallel to, and rest evenly upon, a surface (such as the ground) that supports the structures 580, 585, 590, 595. The bottom surface 588 may be configured to be substantially level with the bottom surfaces of cable protectors 510, 511 and ramps 540, 550. Thus, when tapered transition structure 580, 585, 590, 595 is removably attached to an end of side ramps 540, 550, the bottom surfaces 588 of tapered structures 580, 585, 590, 595 and side ramp 540, 550 may form a continuous, unitary bottom surface, enabling the combined assembly to evenly rest on the surface below.

In at least one embodiment, a portion of the tapered transition structure 580, 585, 590, 595 is configured to laterally overlap at least a portion of a side ramp, cable protector or tapered transition structure that is positioned adjacent to the tapered transition structure 580, 585, 590, 595. For example, a portion of the tapered transition structures 580, 585, 590, 595 may be configured to overlap a portion of ramps 60, 70 described in other embodiments.

In at least one embodiment, a top surface of tapered transition structures 580, 585, 590, 595 is configured to be substantially planar (i.e., flat or even, though not necessarily level with a horizontal plane). In other words, the entirety of the top surface of the tapered transition structure 580, 585, 590, 595 may be configured to evenly taper in both first direction 600 and second direction 605, resulting in a top surface having a substantially flat or planar surface to provide a smooth transition from cable protector 510, 511 and/or side ramps 540, 550 to the ground below.

The cable protectors 510, 511 when arranged end-to-end, as shown in FIGS. 16-19, may have a combined length $L_1$. The side ramps 540, 550, when assembled with a pair of the tapered transition structures 580, 585, 590, 595 may have a combined length $L_2$. In some embodiments, the length $L_1$ is the substantially the same as length $L_2$. In other embodiments, the length $L_1$ is smaller or larger than length $L_2$.

A cable protection system having a side ramp that overlaps or spans a cable protector joint between end-to-end arranged cable protectors can include any type of cable protector and side ramp. For example, at least one of the cable protectors can be a dropover style cable protector having a top surface that is integral with a base portion of the cable protector. In another example, at least three cable protectors are arranged end-to-end and define two spaced apart cable protector joints, and a single side ramp overlaps or spans both of the cable protector joints. In a further example, a tapered transition structure (i.e., one of structures 580, 585, 590, 595) can overlap or cover at least one cable protector joint between end-to-end arranged cable protectors. The tapered transition structure may be configured to mount or connect to each of the cable protector that are arranged end-to-end.

As will be appreciated by those of skill in the art, the exemplary cable protection systems and ramp structures illustrated in FIGS. 1-25 may be adapted to house any number of cables and/or to extend over roadways and walkways of varying lengths. For example, any number of cable protectors in these exemplary systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Similarly, any number of cable protectors in this exemplary system may be removably attached together in an end-to-end fashion to extend the exemplary cable protection system across roadways or walkways of varying widths. For example, as illustrated in FIG. 5, one or more cable protectors 10 may be removably attached together in an end-to-end fashion by one or more ramps 60, 70. Additionally or alternatively, cable protectors 10 may be removably attached together in an end-to-end fashion using one or more end connectors provided on opposing ends of the cable protectors 10. As will be appreciated by those of skill in the art, mixing and matching the various "building blocks" of these exemplary cable protection systems in this manner enables a user to form a system capable of housing any number of cables and/or extending over roadways and walkways of varying lengths. The flexibility of the system as a whole is thus increased, resulting in greater ease of use and interchangeability of parts.

Although the various cable protectors embodiments described and illustrated herein show a cover structure pivotally attached to a base member, various alternative arrangements and configurations fall within the scope of the instant disclosure. For example, the cover structure may be snap fit or otherwise removably attached to the base member. Alternatively, the cable protector may comprise a unitary base member/cover structure having an open base defining a single channel for covering one or more cables.

In addition, although the various cable protector embodiments illustrated herein have been described as having one or more connectors formed on a first side of the base member and one or more apertures formed on an opposing side of the base member, various alternative arrangements and configurations fall within the scope of the instant disclosure. For example, the base members may be formed with connectors on both sides, or may have apertures defined in each of its sides. Similarly, the base members may be formed such that a connector is formed on the same side as an aperture.

The elements of the exemplary cable protection systems and ramp structures illustrated in FIGS. 1-25, such as the cable protectors, side ramps, tapered transition structures, and integral ramp structures illustrated in these figures, may be formed of any number or combination of suitable materials. For example, the elements of these exemplary systems and structures may be molded of a rigid, high-strength plastic material capable of withstanding repeated loadings and stresses. Alternatively or additionally, these elements may be formed of various metallic elements, such as steel or iron. In addition, metal or plastic plating or gripping may be formed on the upper surfaces of one or more of these elements, as illustrated in FIG. 1, to improve the traction of pedestrians or vehicles traveling over the cable protection system.

In addition, the various elements of the exemplary cable protection systems and ramp structures described and illustrated herein may be of any color or opacity. For example, in at least one embodiment the various elements in these systems and structures may be brightly or fluorescently colored to increase the conspicuousness of the system. Additionally or alternatively, the elements in these systems and structures may be formed of a generally or substantially transparent material and illuminated by white or colored light sources to increase the visibility of the system. Generally speaking, coloring or illuminating the various elements of these systems and structures in this manner helps decrease the likelihood of injuries to pedestrians or other motorists due to their failure to notice the cable protection system and/or ramp structure extended over walkways or roadways.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. For example, one or more elements of the exemplary cable protection systems and/or ramp structures described or illustrated herein may be modified as disclosed in U.S. patent application Ser. No. 11/263,099, filed 31 Oct. 2005, and entitled "Cable Protection System," the entirety of which is hereby incorporated by reference.

It is desired that the embodiments described herein be considered in all respects illustrative and not restrictive and that reference be made to the appended claims and their equivalents for determining the scope of the instant disclosure. In addition, for ease of use, the words "including" and "having," as used in the specification and claims, are interchangeable with and have the same meaning as the word "comprising."

What is claimed is:

1. A ramp structure capable of being positioned over at least a portion of a cable protection system, the ramp structure comprising:
    a first center portion having a first side, a second side, a first end and a second end;
    a second center portion having a first side, a second side, a first end and a second end, the first and second center portions arranged in series;
    a first side ramp portion positioned along and in contact with the first side of the first center portion and the first side of the second center portion, the first side ramp portion comprising a first end and a second end;
    a first tapered portion positioned along and in contact with the first end of the first side ramp portion, the first tapered portion having a top surface that includes a first portion that tapers in a first direction away from the first and second center portions, and a second portion that tapers in a second direction away from the first side ramp.

2. The ramp structure of claim 1, wherein the first and second portions of the top surface are each triangular shaped.

3. The ramp structure of claim 1, wherein the first direction is substantially orthogonal to the second direction.

4. The ramp structure of claim 1, wherein the top surface of the first tapered portion is substantially planar.

5. The ramp structure of claim 1, wherein the first tapered portion is substantially triangular in shape.

6. The ramp structure of claim 1, wherein the first end of the second center portion is coupled to the second end of the first center portion at a center portion joint, the first side ramp portion overlapping the center portion joint.

7. The ramp structure of claim 1, further comprising a second tapered portion positioned along and in contact with the second end of the first side ramp portion, the second tapered portion having a top surface that tapers in a least one of a first direction away from the first and second center portions and a second direction away from the first side ramp portion.

8. The ramp structure of claim 7, wherein the first and second tapered portions are coupled to the first side ramp portion, the first and second tapered portions and the first side ramp portion defining a first ramp assembly, the first ramp assembly having a first ramp assembly length that is substantially equal to a combined length of the first and second center ramp portions.

9. The ramp structure of claim 8, wherein the ramp assembly includes a plurality of vertically oriented apertures and the first and second center portions include a plurality of projections that extend from the first and second center portions in a generally vertical direction, the projections being releaseably inserted in the apertures.

10. The ramp structure of claim 7, further comprising:
a second side ramp portion positioned along and in contact with the second side of the first center portion and the second side of the second center portion, the second side ramp portion comprising a first end and a second end;
a third tapered portion positioned along and in contact with the first end of the second side ramp portion, the third tapered portion having a top surface that tapers in at least one of a first direction away from the first and second center portions and a second direction away from the second side ramp portion.

11. The ramp structure of claim 10, further comprising a fourth tapered portion positioned along and in contact with the second end of the second side ramp portion, the fourth tapered portion having a top surface that tapers in at least one of a first direction away from the first and second center portions and a second direction away from the second side ramp portion.

12. The ramp structure of claim 11, wherein the third and fourth tapered portions are coupled to the second side ramp portion, the third and fourth tapered portions and the second side ramp portion defining a second ramp assembly, the second ramp assembly having a second ramp assembly length that is substantially equal to a combined length of the first and second center ramp portions.

13. The ramp structure of claim 12, wherein the second ramp assembly includes a plurality of projections that extend from the ramp assembly in a generally vertical direction, and the first and second center portions include a plurality of vertically oriented apertures, the projections of the second ramp assembly being releaseably inserted in the apertures of the first and second center portions.

14. A cable protection system, comprising:
a first cable protector comprising a first side, a second side, opposing ends, and a top surface, the first cable protector defining at least a first channel extending between the opposing ends of the first cable protector;
a second cable protector comprising a first side, a second side, opposing ends, and a top surface, the second cable protector arranged in series with the first cable protector, the second cable protector defining at least a second channel extending between the opposing ends of the second cable protector, the second channel being coaxial with the first channel;
a first side ramp overlapping a joint between the first and second cable protectors along the first side of the first cable protector and the first side of the second cable protector, the first side ramp comprising a top surface, a first side, a second side, a first end, and a second end;
a first tapered structure releaseably attached to the first end of the first side ramp, the first tapered structure comprising a top surface and a bottom surface, the top surface of the first tapered structure being tapered relative to at least one of the top surface of the first side ramp and the top surface of at least one of the first and second cable protectors to provide a transition from at least one of the top surface of the first side ramp and the top surface of at least one of the first and second cable protectors to a ground surface that supports the cable protection system;
a second tapered structure releaseably attached to the second end of the first side ramp, the second tapered structure comprising a top surface and a bottom surface, the top surface of the second tapered structure being tapered relative to at least one of the top surface of the first side ramp and the top surface of at least one of the first and second cable protectors to provide a transition from at least one of the top surface of the first side ramp and the top surface of at least one of the first and second cable protectors to the ground surface.

15. The cable protection system of claim 14, wherein the top surface of the first tapered structure tapers in a first direction and a second direction.

16. The cable protection system of claim 15, wherein the first direction is substantially orthogonal to the second direction.

17. The cable protection system of claim 14, wherein the first end of the second cable protector is positioned adjacent to the second end of the first cable protector at a cable protector joint, and the first side ramp overlaps the cable protector joint.

18. The cable protection system of claim 17, wherein the cable protector joint is arranged at a midpoint along a length of the first side ramp.

19. The cable protection system of claim 14, wherein the first and second cable protectors are releaseably connected to the first side ramp, the first tapered structure, and the second tapered structure.

20. The cable protection system of claim 14, further comprising:
a second side ramp positioned adjacent to the second side of the first cable protector and the second side of the second cable protector, the second side ramp comprising a top surface, a first side, a second side, a first end, and a second end;
a third tapered structure attached to the first end of the second side ramp;
a fourth tapered structure attached to the second end of the second side ramp.

21. The cable protection system of claim 14, wherein a combined length of the first side ramp and the first and second tapered structures is substantially the same as a combined length of the first and second cable protectors.

22. A cable protection system, comprising:
a first cable protector comprising a first side, a second side, and a first end, and defining at least a first channel structured to receive at least one cable;
a first side ramp positioned along and in contact with the first side of the first cable protector and extending beyond the first end of the first cable protector, the first side ramp being releaseably connected to the first cable protectors;
a first tapered structure releaseably connected to a first end of the first side ramp, the first tapered structure having a top surface that is tapered relative to a top surface of the first side ramp and a top surface of the first cable protector to provide a transition from at least one of the top surface of the first side ramp and the top surface of the first cable protector to a ground surface that supports the cable protection system.

23. The cable protection system of claim 22, further comprising:
a second cable protector comprising a first side and a second side, and defining at least a second channel arranged in alignment with the first channel;
wherein the first side ramp is positioned adjacent to the first side of the second cable protector and is releaseably connected to the second cable protector.

24. The cable protection system of claim 23, further comprising:
a second tapered structure releaseably connected to a second end of the first side ramp, the second tapered structure having a top surface that is tapered relative to the top surface of the first side ramp and the top surface of the second cable protector.

25. The cable protection system of claim 24, wherein the first cable protector is releaseably connected to the first tapered structure, and the second cable protector is releaseably connected to the second tapered structure.

26. A ramp structure capable of being positioned over at least a portion of a cable protection system, the ramp structure comprising:
a first center portion having a first side, a second side, a first end and a second end;
a second center portion having a first side, a second side, a first end and a second end, the first and second center portions arranged in series;
a first side ramp portion positioned adjacent to the first side of the first center portion and the first side of the second center portion, the first side ramp portion comprising a first end and a second end;
a first tapered portion positioned adjacent to the first end of the first side ramp portion, the first tapered portion having a top surface that includes a first portion that tapers in a first direction away from the first and second center portions, and a second portion that tapers in a second direction away from the first side ramp;
a second tapered portion positioned adjacent to the second end of the first side ramp portion, the second tapered portion having a top surface that tapers in at least one of a first direction away from the first and second center portions and a second direction away from the first side ramp portion;
wherein the first and second tapered portions are coupled to the first side ramp portion, the first and second tapered portions and the first side ramp portion defining a first ramp assembly, the first ramp assembly having a first ramp assembly length that is substantially equal to a combined length of the first and second center ramp portions.

27. The ramp structure of claim 26, wherein the ramp assembly includes a plurality of vertically oriented apertures and the first and second center portions include a plurality of projections that extend from the first and second center portions in a generally vertical direction, the projections being releaseably inserted in the apertures.

28. A ramp structure capable of being positioned over at least a portion of a cable protection system, the ramp structure comprising:
a first center portion having a first side, a second side, a first end and a second end;
a second center portion having a first side, a second side, a first end and a second end, the first and second center portions arranged in series;
a first side ramp portion positioned adjacent to the first side of the first center portion and the first side of the second center portion, the first side ramp portion comprising a first end and a second end;
a first tapered portion positioned adjacent to the first end of the first side ramp portion, the first tapered portion having a top surface that includes a first portion that tapers in a first direction away from the first and second center portions, and a second portion that tapers in a second direction away from the first side ramp;
a second tapered portion positioned adjacent to the second end of the first side ramp portion, the second tapered portion having a top surface that tapers in at least one of a first direction away from the first and second center portions and a second direction away from the first side ramp portion;
a second side ramp portion positioned adjacent to the second side of the first center portion and the second side of the second center portion, the second side ramp portion comprising a first end and a second end;
a third tapered portion positioned adjacent to the first end of the second side ramp portion, the third tapered portion having a top surface that tapers in at least one of a first direction away from the first and second center portions and a second direction away from the second side ramp portion;
a fourth tapered portion positioned adjacent to the second end of the second side ramp portion, the fourth tapered portion having a top surface that tapers in at least one of a first direction away from the first and second center portions and a second direction away from the second side ramp portion;
wherein the third and fourth tapered portions are coupled to the second side ramp portion, the third and fourth tapered portions and the second side ramp portion defining a second ramp assembly, the second ramp assembly having a second ramp assembly length that is substantially equal to a combined length of the first and second center ramp portions.

29. The ramp assembly of claim 28, wherein the second ramp assembly includes a plurality of projections that extend from the ramp assembly in a generally vertical direction, and the first and second center portions include a plurality of vertically oriented apertures, the projections of the second ramp assembly being releaseably inserted in the apertures of the first and second center portions.

30. A cable protection system, comprising:
a first cable protector comprising a first side, a second side, opposing ends, and a top surface, the first cable protector defining at least a first channel extending between the opposing ends of the first cable protector;
a second cable protector comprising a first side, a second side, opposing ends, and a top surface, the second cable protector arranged in series with the first cable protector, the second cable protector defining at least a second channel extending between the opposing ends of the second cable protector, the second channel being coaxial with the first channel;
a first side ramp positioned adjacent to the first side of the first cable protector and the first side of the second cable protector, the first side ramp comprising a top surface, a first side, a second side, a first end, and a second end;
a first tapered structure releaseably attached to the first end of the first side ramp, the first tapered structure comprising a top surface and a bottom surface, the top surface of the first tapered structure being tapered relative to at least one of the top surface of the first side ramp and the top surface of at least one of the first and second cable protectors;

a second tapered structure releaseably attached to the second end of the first side ramp, the second tapered structure comprising a top surface and a bottom surface, the top surface of the first tapered structure being tapered relative to at least one of the top surface of the first side ramp and the top surface of at least one of the first and second cable protectors;

wherein a combined length of the first side ramp and the first and second tapered structures is substantially the same as a combined length of the first and second cable protectors.

31. A cable protection system, comprising:
a first cable protector comprising a first side, a second side, opposing ends, and a top surface, the first cable protector defining at least a first channel extending between the opposing ends of the first cable protector;
a second cable protector comprising a first side, a second side, opposing ends, and a top surface, the second cable protector arranged in series with the first cable protector, the second cable protector defining at least a second channel extending between the opposing ends of the second cable protector, the second channel being coaxial with the first channel;
a first side ramp overlapping a joint between the first and second cable protectors along the first side of the first cable protector and the first side of the second cable protector, the first side ramp comprising a top surface, a first side, a second side, a first end, and a second end;
a first tapered structure releaseably attached to the first end of the first side ramp, the first tapered structure comprising a top surface and a bottom surface, the top surface of the first tapered structure being tapered relative to at least one of the top surface of the first side ramp and the top surface of at least one of the first and second cable protectors;
a second tapered structure releaseably attached to the second end of the first side ramp, the second tapered structure comprising a top surface and a bottom surface, the top surface of the first tapered structure being tapered relative to at least one of the top surface of the first side ramp and the top surface of at least one of the first and second cable protectors;

wherein the top surface of the first tapered structure tapers in a first direction and a second direction, the first direction being substantially orthogonal to the second direction.

32. A cable protection system, comprising:
a first cable protector comprising a first side, a second side, opposing ends, and a top surface, the first cable protector defining at least a first channel extending between the opposing ends of the first cable protector;
a second cable protector comprising a first side, a second side, opposing ends, and a top surface, the second cable protector arranged in series with the first cable protector, the second cable protector defining at least a second channel extending between the opposing ends of the second cable protector, the second channel being coaxial with the first channel;
a first side ramp overlapping a joint between the first and second cable protectors along the first side of the first cable protector and the first side of the second cable protector, the first side ramp comprising a top surface, a first side, a second side, a first end, and a second end;
a first tapered structure releaseably attached to the first end of the first side ramp, the first tapered structure comprising a top surface and a bottom surface, the top surface of the first tapered structure being tapered relative to at least one of the top surface of the first side ramp and the top surface of at least one of the first and second cable protectors;
a second tapered structure releaseably attached to the second end of the first side ramp, the second tapered structure comprising a top surface and a bottom surface, the top surface of the first tapered structure being tapered relative to at least one of the top surface of the first side ramp and the top surface of at least one of the first and second cable protectors;
a second side ramp positioned adjacent to the second side of the first cable protector and the second side of the second cable protector, the second side ramp comprising a top surface, a first side, a second side, a first end, and a second end;
a third tapered structure attached to the first end of the second side ramp; and
a fourth tapered structure attached to the second end of the second side ramp.

* * * * *